United States Patent
Sato

(10) Patent No.: US 12,036,783 B2
(45) Date of Patent: Jul. 16, 2024

(54) PRETREATMENT LIQUID, INK SET, AND IMAGE RECORDING METHOD

(71) Applicant: FUJIFILM Corporation, Tokyo (JP)

(72) Inventor: Yuki Sato, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 605 days.

(21) Appl. No.: 17/195,668

(22) Filed: Mar. 9, 2021

(65) Prior Publication Data

US 2021/0187971 A1 Jun. 24, 2021

Related U.S. Application Data

(63) Continuation of application No. PCT/JP2019/034817, filed on Sep. 4, 2019.

(30) Foreign Application Priority Data

Sep. 28, 2018 (JP) .................... 2018-185461

(51) Int. Cl.

| | | |
|---|---|---|
| B41J 11/00 | (2006.01) | |
| B41M 5/00 | (2006.01) | |
| C08F 220/14 | (2006.01) | |
| C09D 11/102 | (2014.01) | |
| C09D 11/106 | (2014.01) | |
| C09D 11/107 | (2014.01) | |
| C09D 11/322 | (2014.01) | |
| C09D 11/38 | (2014.01) | |
| C09D 11/40 | (2014.01) | |
| C09D 11/54 | (2014.01) | |
| C09D 133/06 | (2006.01) | |
| C09D 133/08 | (2006.01) | |
| B41J 2/01 | (2006.01) | |

(52) U.S. Cl.
CPC ........ B41J 11/0015 (2013.01); B41M 5/0017 (2013.01); C08F 220/14 (2013.01); C09D 11/102 (2013.01); C09D 11/106 (2013.01); C09D 11/107 (2013.01); C09D 11/322 (2013.01); C09D 11/38 (2013.01); C09D 11/40 (2013.01); C09D 11/54 (2013.01); C09D 133/066 (2013.01); C09D 133/08 (2013.01); B41J 2/01 (2013.01)

(58) Field of Classification Search
CPC ........ B41J 11/0015; B41J 2/01; C08F 220/14; C08F 220/301; C09D 11/102; C09D 11/107; C09D 11/54; C09D 133/08; C09D 11/106; C09D 11/322; C09D 11/38; C09D 11/40; C09D 133/066; B41M 7/009; B41M 5/0017
See application file for complete search history.

(56) References Cited

U.S. PATENT DOCUMENTS

| | | | |
|---|---|---|---|
| 2006/0087540 A1* | 4/2006 | Morimoto | D06P 1/653 347/95 |
| 2006/0203055 A1 | 9/2006 | Doi | |
| 2006/0293410 A1 | 12/2006 | Tokita et al. | |
| 2010/0080911 A1 | 4/2010 | Okada | |
| 2012/0320123 A1 | 12/2012 | Takeda et al. | |
| 2015/0166819 A1 | 6/2015 | Shinohara | |
| 2016/0222238 A1 | 8/2016 | Arai et al. | |
| 2017/0349774 A1* | 12/2017 | Shimono | B41M 5/0017 |

FOREIGN PATENT DOCUMENTS

| | | | |
|---|---|---|---|
| CN | 102471623 | 5/2012 | |
| JP | 2000019467 | 1/2000 | |
| JP | 2006248049 | 9/2006 | |
| JP | 2006248049 A * | 9/2006 | ............. C09D 11/30 |
| JP | 2007002122 | 1/2007 | |
| JP | 2007176966 | 7/2007 | |
| JP | 2012223975 | 11/2012 | |
| JP | 2013001854 | 1/2013 | |
| JP | 5554290 | 7/2014 | |
| JP | 2016168782 | 9/2016 | |
| JP | 2018114751 | 7/2018 | |
| WO | 2014050751 | 4/2014 | |

OTHER PUBLICATIONS

Office Action of China Counterpart Application, with English translation thereof, issued on Sep. 19, 2022, pp. 1-19.
Office Action of India Counterpart Application, issued on Aug. 8, 2022, pp. 1-2.
"Office Action of China Counterpart Application" with English translation thereof, issued on Apr. 14, 2022, p. 1-p. 19.
"International Search Report (Form PCT/ISA/210) of PCT/JP2019/034817," mailed on Oct. 29, 2019, with English translation thereof, pp. 1-5.
"Written Opinion of the International Searching Authority (Form PCT/ISA/237) of PCT/JP2019/034817," mailed on Oct. 29, 2019, with English translation thereof, pp. 1-15.
Office Action of India Counterpart Application, issued on Jul. 19, 2021, pp. 1-5.
"Office Action of China Counterpart Application" with English translation thereof, issued on Nov. 29, 2021, p. 1-p. 18.
"Office Action of Japan Counterpart Application" with English translation thereof, issued on Oct. 26, 2021, p. 1-p. 5.
"Search Report of Europe Counterpart Application", issued on Dec. 17, 2021, pp. 1-11.

* cited by examiner

Primary Examiner — Yaovi M Ameh

(74) Attorney, Agent, or Firm — JCIPRNET

(57) ABSTRACT

A pretreatment liquid includes a water-soluble polymer having a weight-average molecular weight of 5000 or greater, an acid, and a salt of the acid, in which the acid is a carboxylic acid, and the salt of the acid is a salt of the carboxylic acid; the ink set includes the pretreatment liquid; and the image recording method includes a pretreatment liquid application step and an ink application step.

12 Claims, 2 Drawing Sheets

2pt

3pt

4pt

5pt

2mm

PRETREATMENT LIQUID, INK SET, AND IMAGE RECORDING METHOD

CROSS-REFERENCE TO RELATED APPLICATIONS

This application is a Continuation of PCT International Application No. PCT/JP2019/034817 filed on Sep. 4, 2019, which claims priority under 35 U.S.C § 119(a) to Japanese Patent Application No. 2018-185461 filed on Sep. 28, 2018. Each of the above application(s) is hereby expressly incorporated by reference, in its entirety, into the present application.

BACKGROUND OF THE INVENTION

1. Field of the Invention

The present disclosure relates to a pretreatment liquid, an ink set, and an image recording method.

2. Description of the Related Art

In the technical field of image recording, it has been known to use a pretreatment liquid containing an aggregating agent that aggregates components in an ink. The pretreatment liquid may be used for the purpose of preventing bleeding of an image to be recorded with an ink by applying the pretreatment liquid to a recording medium before the ink is applied to the recording medium.

As the above-described technique, for example, JP2012-223975A describes a set of an ink and a reaction solution, which is a combination of an ink containing a pigment and a water-soluble resin and a reaction solution having a buffering capacity in an acidic region, in which the pigment is a self-dispersing pigment having a surface charge amount of 0.20 mmol/g or greater which is acquired by colloidal titration, and the water-soluble resin is a copolymer having a unit derived from (meth)acrylic acid.

JP5554290B describes an ink set containing an ink composition that contains a pigment and water; and a treatment liquid that contains an organic acidic compound, a polymer compound having a structural unit represented by General Formula (A) and a structural unit represented by General Formula (B), and water.

SUMMARY OF THE INVENTION

For example, an acid may be used as the aggregating agent, and it is considered that in a case where an acid is used as the aggregating agent, bleeding of an image is suppressed so that the image quality can be improved.

However, in the case where an acid is used as an aggregating agent, since the pH of the pretreatment liquid is decreased, there are concerns for work safety (for example, in a case where the pretreatment liquid adheres to an operator's skin, eyes, or the like during an operation), member corrosiveness of the system, and the like.

Therefore, from the viewpoint of increasing the pH of the pretreatment liquid to improve the work safety and the member corrosiveness due to the acid, it is considered to add a salt (for example, a salt obtained by neutralizing the above-described acid) of the acid in addition to the acid serving as the aggregating agent.

Here, in order to maintain the aggregation function of the pretreatment liquid, in a case where an increase in content of the acid and a salt of the acid in the pretreatment liquid is required, there is a clear problem in that image unevenness is likely to occur depending on the kind of a recording medium to which the pretreatment liquid is applied in the case where the content of the acid and a salt of the acid has been increased.

The reason why the above-described image unevenness occurs is not clear, but the following point is assumed to be one factor of occurrence of the image unevenness.

In a case where the pretreatment liquid is applied to a surface of the recording medium and dried, a region where the pretreatment liquid is sufficiently dried and a region where the pretreatment liquid is not sufficiently dried are generated due to the non-uniformity of the surface shape, the composition, and the like of the recording medium, and thus drying unevenness of the pretreatment liquid occurs. Further, it is assumed that there is a difference in density of the ink composition in each region between the region where the pretreatment liquid is sufficiently dried and the region where the pretreatment liquid is not sufficiently dried, and as a result, the difference is a factor of occurrence of the image unevenness.

On the contrary, in a case where the pretreatment liquid of the present disclosure contains a water-soluble polymer having a weight-average molecular weight of 5000 or greater, the water-soluble polymer can be present on the surface of the recording medium without excessive permeation into the recording medium. In this manner, since the surface of the recording medium can be uniformly covered with a film formed of the water-soluble polymer, the drying unevenness can be reduced and the image unevenness can be suppressed.

It is considered that the molecular weight of the polymer is small and the polymer is likely to permeate into the recording medium in the invention described in JP2012-223975A, and thus suppression of the image unevenness cannot be expected.

Since the pH of the treatment liquid is assumed to be low in the invention described in JP5554290B, the member corrosiveness may be significant.

An object to be achieved by an embodiment of the present disclosure is to provide a pretreatment liquid and an ink set which are capable of suppressing member corrosiveness and satisfactorily suppressing image unevenness.

An object to be achieved by another embodiment of the present disclosure is to provide an image recording method which enables member corrosiveness to be suppressed and image unevenness to be satisfactorily suppressed.

Specific means for achieving the above-described objects include the following aspects.

<1> A pretreatment liquid comprising: a water-soluble polymer having a weight-average molecular weight of 5000 or greater; an acid; and a salt of the acid, in which at least one of the acid is a carboxylic acid, and at least one salt of the acid is a salt of the carboxylic acid.

<2> The pretreatment liquid according to <1>, in which a pH of the pretreatment liquid is smaller than a maximum pKa of an acid group contained in the acid and the salt of the acid.

<3> The pretreatment liquid according to <1> or <2>, in which the water-soluble polymer contains at least one selected from the group consisting of polyvinylpyrrolidone, polyethylene glycol, and polyacrylic acid.

<4> The pretreatment liquid according to any one of <1> to <3>, in which the water-soluble polymer is a nonionic water-soluble polymer.

<5> The pretreatment liquid according to any one of <1> to <4>, in which a content of the water-soluble polymer is in a range of 0.1% by mass to 9% by mass with respect to a total mass of the pretreatment liquid.

<6> The pretreatment according to any one of <1> to <5>, in which a total content of acid groups in the acid and the salt of the acid is 0.25 mol or greater with respect to 100 g of the pretreatment liquid.

<7> The pretreatment liquid according to any one of <1> to <6>, further comprising at least one of phosphoric acid or a salt of the phosphoric acid.

<8> The pretreatment liquid according to any one of <1> to <7>, in which the salt of the carboxylic acid is a salt of an alkali metal.

<9> An ink set comprising: the pretreatment liquid according to any one of <1> to <8>; and an ink composition containing water and a colorant.

<10> An image recording method comprising: a pretreatment liquid application step of applying the pretreatment liquid in the ink set according to <9> to a recording medium; and an ink application step of applying the ink composition in the ink set according to <9> to the recording medium to which the pretreatment liquid has been applied in the pretreatment liquid application step.

<11> The image recording method according to <10>, further comprising: a heating and fixing step of heating and fixing an image recorded by the ink application step.

According to an aspect of the present disclosure, it is possible to provide a pretreatment liquid and an ink set which are capable of suppressing member corrosiveness and satisfactorily suppressing image unevenness.

According to another aspect of the present disclosure, it is possible to provide an image recording method which enables member corrosiveness to be suppressed and image unevenness to be satisfactorily suppressed.

DESCRIPTION OF THE PREFERRED EMBODIMENTS

Figure 1:
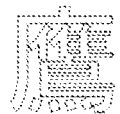
FIG. 1 is a view conceptually showing characters in character images used for evaluation of bleeding of images in examples.
Figure 1:
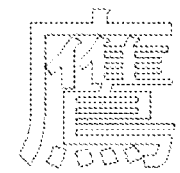
Figure 1:
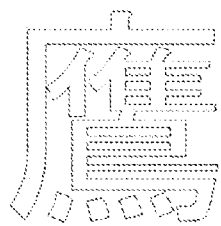
Figure 1:
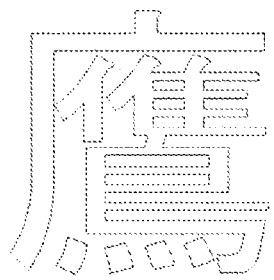

In the present disclosure, a numerical range shown using "to" indicates a range including the numerical values described before and after "to" as a lower limit and an upper limit.

In a numerical range described in a stepwise manner in the present disclosure, an upper limit or a lower limit described in a certain numerical range may be replaced with an upper limit or a lower limit in another numerical range described in a stepwise manner or may be replaced with a value described in an example.

In the present disclosure, in a case where a plurality of substances corresponding to respective components in a composition are present, the amount of the respective components in the composition indicates the total amount of the plurality of substances present in the composition unless otherwise specified.

In the present disclosure, the meaning of the term "step" includes not only an independent step but also a step whose intended purpose is achieved even in a case where the step is not clearly distinguished from other steps.

In the present disclosure, "image recording" or "recording of an image" indicates that an image is drawn on a base material using a first ink composition and a second ink composition.

In the present disclosure, the "image quality" indicates the definition of an image.

In the present disclosure, a combination of preferred embodiments is a more preferred embodiment.

In the present disclosure, the "acid groups" include acid groups contained in acids and salts of the acids. For example, in a case where an acid and a salt of the acid are a carboxylic acid and a salt of the carboxylic acid, —COOH and —COO⁻ are acid groups.

<<Pretreatment Liquid>>

A pretreatment liquid according to the embodiment of the present disclosure is a pretreatment liquid containing a water-soluble polymer having a weight-average molecular weight of 5000 or greater, an acid, and a salt of the acid, in which at least one of the acid is a carboxylic acid, and at least one salt of the acid is a salt of the carboxylic acid.

The pretreatment liquid according to the embodiment of the present disclosure contains acids and partially contains salts of the acid, and thus the pH of the pretreatment liquid can be increased. In this manner, work safety can be improved and corrosiveness due to the pretreatment liquid can be reduced.

However, an increase in content of the acids and the salts of the acids in the pretreatment liquid is required in order to maintain the aggregation function of the pretreatment liquid, and in a case where the content of both the acids and the salts of the acids is increased, image unevenness (density unevenness) is likely to occur in an image to be recorded by applying the pretreatment liquid and applying a colored ink, depending on the kind of a recording medium to which the pretreatment liquid is applied. The image unevenness tends to be particularly significant in a case of using coated paper used for a paper container package or the like.

Meanwhile, since the pretreatment liquid according to the embodiment of the present disclosure contains acids and salts of the acids as aggregation components; and a water-soluble polymer having a weight-average molecular weight of 5000 or greater, the water-soluble polymer can be present on the surface of the recording medium without excessive permeation into the recording medium while the aggregation function of the pretreatment liquid is maintained. In this manner, since the surface of the recording medium can be uniformly covered with a film formed of the water-soluble polymer, the drying unevenness can be reduced and the image unevenness can be suppressed.

Hereinafter, the pretreatment liquid according to the embodiment of the present disclosure will be described in detail.

(Water-Soluble Polymer)

The pretreatment liquid according to the embodiment of the present disclosure contains a water-soluble polymer having a weight-average molecular weight of 5000 or greater.

Since the weight-average molecular weight of the water-soluble polymer is 5000 or greater, excessive permeation of the water-soluble polymer into the recording medium can be prevented. Further, in a case where an ink composition described below is applied after the pretreatment liquid is applied, the aggregation rate of the ink composition can be suppressed to some extent. Further, the surface of the recording medium is coated with a highly hydrophilic water-soluble polymer, and thus the spread of ink droplets in the ink composition can be improved. In this manner, image unevenness can be satisfactorily suppressed.

Further, in the present disclosure, the term "water-soluble" indicates a property that the amount of a substance to be dissolved in 100 g of water at 25° C. is 1 g or greater (preferably 3 g or greater).

From the viewpoints of suppressing permeation of the water-soluble polymer into the recording medium and suppressing image unevenness, the weight-average molecular weight of the water-soluble polymer is preferably 7500 or greater and more preferably 10000 or greater.

From the viewpoints of the coating property in a case of application to the recording medium using a coating method, the jetting property in a case of application of the pretreatment liquid using an ink jet method, and the solubility in the pretreatment liquid, the weight-average molecular weight of the water-soluble polymer is 40000 or lower and more preferably 30000 or lower.

Further, the weight-average molecular weight can be measured by gel permeation chromatography (GPC). The measurement according to GPC is performed using HLC-8020GPC (manufactured by Tosoh Corporation), three columns of TSKgel, Super Multipore HZ-H (manufactured by Tosoh Corporation, 4.6 mmID×15 cm), and tetrahydrofuran (THF) as an eluent. Further, the measurement is performed under conditions of a sample concentration of 0.45% by mass, a flow rate of 0.35 ml/min, a sample injection volume of 10 µl, and a measurement temperature of 40° C. using an IR detector. Further, the calibration curve is prepared using eight samples of "F-40", "F-20", "F-4", "F-1", "A-5000", "A-2500", "A-1000", and "n-propylbenzene" which are "Standard Samples TSK standard, polystyrene" (manufactured by Tosoh Corporation).

The content of the water-soluble polymer in the pretreatment liquid according to the embodiment of the present disclosure is not particularly limited, but the content of the water-soluble polymer is preferably in a range of 0.1% by mass to 9% by mass with respect to the total mass of the pretreatment liquid.

In a case where the content thereof is 0.1% by mass or greater, the spread of ink droplets can be further promoted. Further, in a case where the content thereof is 9% by mass or less, the thickening of the pretreatment liquid can be further suppressed.

In a case where the content thereof is 9% by mass or less, deposition of the water-soluble polymer due to coagulation or salting out of the water-soluble polymer with a salt of an acid described below, phase separation, and the like can be avoided, and thus the liquid stability of the pretreatment liquid is improved.

From the same viewpoint as described above, the content of the water-soluble polymer is more preferably in a range of 0.5% by mass to 9% by mass with respect to the total mass of the pretreatment liquid.

Examples of the water-soluble polymer include a cellulose derivative, a polyvinyl derivative, polyacrylic acid, and a polyhydric alcohol polymer.

Among these, from the viewpoint of suppressing image unevenness, a polyvinyl derivative, polyacrylic acid, or a polyhydric alcohol polymer is preferable as the water-soluble polymer.

From the viewpoint of satisfactorily suppressing image unevenness, the water-soluble polymer contains preferably at least one selected from the group consisting of polyvinylpyrrolidone, polyethylene glycol, polyacrylic acid, polyacrylamide, polymethyl vinyl ether, and polyisopropylacrylamide and more preferably at least one selected from the group consisting of polyvinylpyrrolidone, polyethylene glycol, and polyacrylic acid.

The water-soluble polymer may be a copolymer, for example, a copolymer of a monomer such as vinylpyrrolidone, acrylic acid, or ethylene glycol and another monomer.

It is preferable that the water-soluble polymer is a nonionic water-soluble polymer. In this manner, the liquid stability of the pretreatment liquid can be more satisfactorily maintained.

Examples of the nonionic water-soluble polymer include polyvinylpyrrolidone, polyacryl amide, polymethyl vinyl ether, and polyisopropylacrylamide.

(Acid and Salt of Acid)

The pretreatment liquid according to the embodiment of the present disclosure contains acids and salts of the acids. Further, at least one of the acids is a carboxylic acid, and at least one of the salts of the acids is a salt of the carboxylic acid.

That is, there is a case where the pretreatment liquid according to the embodiment of the present disclosure contains only a carboxylic acid and a salt of the carboxylic acid in addition to a case where the pretreatment liquid contains a carboxylic acid and a salt of the carboxylic acid, and other acids and/or salts thereof.

—Acid—

In a case where the pretreatment liquid according to the embodiment of the present disclosure contains at least one kind of carboxylic acid, the carboxylic acid can aggregate the ink composition described below. Further, a decrease in pH of the pretreatment liquid can be suppressed by allowing the pretreatment liquid to contain a carboxylic acid which is a weak acid rather than a strong acid so that the pretreatment liquid contains a sufficient amount of acid groups for aggregating the ink. Since a decrease in pH of the pretreatment liquid can be suppressed, the member corrosiveness due to the pretreatment liquid can be satisfactorily suppressed.

As the acid, a compound containing two or more carboxy groups in one molecule is preferable.

As the compound containing two or more carboxy groups in one molecule, tartaric acid, phthalic acid, 4-methylphthalic acid, DL-malic acid, succinic acid, citric acid, pimelic acid, malonic acid, glutaric acid, adipic acid, dimethylmalonic acid, or maleic acid is preferable, and DL-malic acid, malonic acid, succinic acid, citric acid, glutaric acid, dimethylmalonic acid, or maleic acid is more preferable. Further, these may be used alone or in combination of two or more kinds thereof.

Further, a compound represented by General Formula (I) is also suitable as the acid. In this manner, the aggregating property is further enhanced, and the movement of the ink droplets applied onto the recording medium is further suppressed.

$$C_nH_{2n+2-m}(COOH)_m \qquad \text{General Formula (I)}$$

[In General Formula (I), n represents an integer of 2 or greater, and m represents an integer of 3 or greater.]

In General Formula (I), it is preferable that n represents an integer of 3 to 5.

Further, in General Formula (I), it is preferable that m represents an integer of 3 to 5.

Specific examples of the compound represented by General Formula (I) include 1,2,3-propanetricarboxylic acid, 1,3,5-pentanetricarboxylic acid, and 1,2,3,4-butanetetracarboxylic acid.

Further, the content of the adds contained in the pretreatment liquid according to the embodiment of the present disclosure can be appropriately selected within a range where the total content of the acid groups in the acids and the salts of the acids described below is 0.25 mol or greater with respect to 100 g of the pretreatment liquid.

—Salt of Acid—

The pretreatment liquid according to the embodiment of the present disclosure contains salts of acids, and at least one of the salts of the acids is a salt of a carboxylic acid.

The pH of the pretreatment liquid can be increased to some extent without impairing the aggregation function of the carboxylic acid by allowing the pretreatment liquid to contain at least one kind of salt of the carboxylic acid. In this manner, the image quality of a recorded image can be improved, and the member corrosiveness can be suppressed.

A salt of the carboxylic acid can be obtained, for example, by neutralizing a part of the above-described acid (carboxylic acid) with a basic compound.

The basic compound is not particularly limited, and examples thereof include an alkali metal hydroxide and an alkaline earth metal hydroxide. Among these, from the viewpoint of the solubility in the pretreatment liquid, an alkali metal hydroxide is preferable.

That is, it is preferable that the salt of the carboxylic acid which is obtained by neutralizing a part of the above-described carboxylic acid with, for example, an alkali metal hydroxide is an alkali metal salt.

Examples of the alkali metal hydroxide and the alkaline earth metal hydroxide include potassium hydroxide, sodium hydroxide, magnesium hydroxide, and calcium hydroxide. Among these, from the viewpoint of the solubility in the pretreatment liquid, sodium hydroxide and potassium hydroxide are preferable. In the comparison between sodium hydroxide and potassium hydroxide, potassium hydroxide is more preferable from the viewpoint of the solubility in the pretreatment liquid, but sodium hydroxide and potassium hydroxide are practically preferable.

As described above, in a case where an acid is neutralized to obtain a salt of the acid, it is preferable that the pH of the pretreatment liquid after the neutralization is smaller than the maximum pKa of an acid group contained in the acids and the salts of the acids. That is, in a case where a plurality of kinds of acid groups are mixedly present, it is preferable that the value of the pretreatment liquid is smaller than the pKa value of the acid having the maximum pKa. In this manner, the aggregation function of the acid can be satisfactorily maintained, the pH of the pretreatment liquid can be increased, and the member corrosiveness can be more satisfactorily suppressed.

Further, in the present disclosure, the value described in Analytical Chemistry Handbook (revised 6th Edition, edited by the Japan Society for Analytical Chemistry, pp. 625) is used as the pKa.

The maximum pKa of the acid group contained in the acids and the salts of the acids is the pKa which is the maximum value among the pKa values of all the acid groups contained in the acids and the salts of the acids.

The total content of the acid groups in the acids and the salts of the acids is preferably 0.25 mol or greater with respect to 100 g of the pretreatment liquid.

In this manner, the ink composition can be more satisfactorily aggregated so that the image quality of the obtained image can be improved. Further, bleeding of the image can be suppressed.

From the above-described viewpoint, the total content of the acid groups in the acids and the salts of the acids is more preferably 0.3 mol or greater and still more preferably 0.4 mol or greater with respect to 100 g of the pretreatment liquid.

The total content of the acid groups in the acids and the salts of the acids may be 1.0 mol or less with respect to 100 g of the pretreatment liquid. Further, the total content of the acid groups is calculated by multiplying the content by the valence of the acid used. For example, in a case where 0.05 mol of malonic acid (divalent) and 0.05 mol of tripotassium citrate are dissolved in 100 g of the pretreatment liquid, the content of the acid groups is calculated based on an equation of "0.05×2+0.05×3=0.25 mol".

The content of the salts of the acids with respect to the total mass of the acids can be appropriately selected within a range where the total content of the acid groups in the acids and the salts of the acids described below is 0.25 mol or greater with respect to 100 g of the pretreatment liquid.

It is preferable that the pretreatment liquid according to the embodiment of the present disclosure further contains at least one of phosphoric acid or a salt of the phosphoric acid as the acid and the salt of the acid.

By allowing the pretreatment liquid to contain phosphoric acid, for example, in a case where the recording medium contains calcium carbonate, the calcium carbonate reacts with the phosphoric acid in the pretreatment liquid to insolubilize calcium in the calcium carbonate. Therefore, it is possible to suppress the deposition of the calcium on the surface of the image. In this manner, it is possible to further suppress generation of white portions on the recorded image, so-called white spots (that is, white deposits on the image) generated by the deposition of the calcium.

As the phosphoric acid, for example, orthophosphorous acid (hereinafter, also simply referred to as "phosphoric acid"), phosphorous acid, hypophosphorous acid, pyrophosphoric acid, metaphosphoric acid, polyphosphoric acid, and salts thereof can be used.

In the pretreatment liquid according to the embodiment of the present disclosure, the content of the carboxylic acid and the salt of the carboxylic acid with respect to the total of the acids and the salts of the acids is not particularly limited, but from the viewpoint of satisfactorily exhibiting the aggregating property, it is preferable that the pretreatment liquid contains 60% or greater of the carboxylic acid or the salt of the carboxylic acid in all the acid groups in proportion to the number of acid groups.

(Water)

It is preferable that the pretreatment liquid according to the embodiment of the present disclosure contains water. The content of water is not particularly limited, but is preferably in a range of 10% by mass to 99% by mass, more preferably in a range of 50% by mass to 90% by mass, and still more preferably in a range of 60% by mass to 80% by mass.

(Organic Solvent)

It is preferable that the pretreatment liquid according to the embodiment of the present disclosure contains at least one selected from organic solvents.

As the organic solvent, an organic solvent (hereinafter, also referred to as a "water-soluble organic solvent") to be dissolved in 100 g of water at 20° C. by an amount of 5 g or greater is preferable.

As the water-soluble organic solvent, a solvent which is the same as the water-soluble organic solvent contained in the ink described below can be used. Among examples of the organic solvent, from the viewpoints of suppressing curling and reducing the surface tension of the pretreatment liquid to improve the coating property, polyalkylene glycol or a derivative thereof is preferable and at least one selected from diethylene glycol monoalkyl ether, triethylene glycol monoalkyl ether, dipropylene glycol, tripropylene glycol monoalkyl ether, polyoxypropylene glyceryl ether, or polyoxyethylene polyoxypropylene glycol is more preferable.

The content of the organic solvent in the pretreatment liquid is not particularly limited, but is preferably in a range of 0.5% by mass to 30% by mass and more preferably in a range of 0.5% by mass to 10% by mass with respect to the entirety of the pretreatment liquid, from the viewpoints of suppressing curling and reducing the surface tension of the pretreatment liquid to improve the coating property.

(Nitrogen-Containing Heterocyclic Compound and Organic Mercapto Compound)

The pretreatment liquid according to the embodiment of the present disclosure may contain at least one selected from a nitrogen-containing heterocyclic compound or an organic mercapto compound.

—Nitrogen-Containing Heterocyclic Compound—

As the structure of the nitrogen-containing heterocyclic compound, a nitrogen-containing 5-membered ring structure or a nitrogen-containing 6-membered ring structure is preferable. Among these, a nitrogen-containing 5-membered ring structure is more preferable.

Among examples of the nitrogen-containing 5-membered ring structure and the nitrogen-containing 6-membered ring structure, a 5- or 6-membered heterocyclic structure containing at least one atom preferably selected from a carbon atom, a nitrogen atom, an oxygen atom, a sulfur atom, or a selenium atom is preferable.

Further, this heterocycle may be condensed with a carbon aromatic ring or a heteroaromatic ring.

Examples of the heterocycle include a tetrazole ring, a triazole ring, an imidazole ring, a thiadiazole ring, an oxadiazole ring, a selenadiazole ring, an oxazole ring, a thiazole ring, a benzoxazole ring, a benzothiazole ring, a benzimidazole ring, a pyrimidine ring, a triazaindene ring, a tetraazaindene ring, and a pentaazaindene ring.

These rings may include a substituent, and the substituent may be substituted with a nitro group, a halogen atom (such as a chlorine atom or a bromine atom), a mercapto group, a cyano group, a substituted or unsubstituted alkyl group (such as each group of methyl, ethyl, propyl, t-butyl, or cyanoethyl), a substituted or unsubstituted aryl group (such as each group of phenyl, 4-methanesulfonamide phenyl, 4-methylphenyl, 3,4-dichlorophenyl, or naphthyl), a substituted or unsubstituted alkenyl group (such as an allyl group), a substituted or unsubstituted aralkyl group (such as each group of benzyl, 4-methylbenzyl, or phenethyl), a substituted or unsubstituted sulfonyl group (such as each group of methanesulfonyl, ethanesulfonyl, or p-toluenesulfonyl), a substituted or unsubstituted carbamoyl group (such as each group of unsubstituted carbamoyl, methyl carbamoyl, or phenyl carbamoyl), a substituted or unsubstituted sulfamoyl group (such as each group of unsubstituted sulfamoyl, methyl sulfamoyl, or phenyl sulfamoyl), a substituted or unsubstituted carbonamide group (such as each group of acetamide or benzamide), a substituted or unsubstituted sulfonamide group (such as each group of methanesulfonamide, benzenesulfonamide, or p-toluenesulfonamide), a substituted or unsubstituted acyloxy group (such as each group of acetyloxy or benzoyloxy), a substituted or unsubstituted sulfonyloxy group (such as methanesulfonyloxy), a substituted or unsubstituted ureido group (such as each group of unsubstituted ureido, methylureido, ethylureido, or phenylureido), a substituted or unsubstituted acyl group (such as each group of acetyl or benzoyl), a substituted or unsubstituted oxycarbonyl group (such as each group of methoxycarbonyl or phenoxycarbonyl), a substituted or unsubstituted oxycarbonylamino group (such as each group of methoxycarbonylamino, phenoxycarbonylamino, or 2-ethylhexyloxycarbonylamino), and a substituted or unsubstituted hydroxyl group. The substituent may be substituted with one ring several times.

Specific preferred examples of the nitrogen-containing heterocyclic compound include the followings.

That is, examples thereof include imidazole, benzimidazole, indazole, benzotriazole, tetrazole, benzoxazole, benzothiazole, pyridine, quinoline, pyrimidine, piperidine, piperazine, quinoxaline, and morpholine, and these may include the substituent such as an alkyl group, a carboxy group, or a sulfa group described above.

Preferred examples of the nitrogen-containing 6-membered ring compound include compounds having a triazine ring, a pyrimidine ring, a pyridine ring, a pyrroline ring, a piperidine ring, a pyridazine ring, or a pyrazine ring. Among these, compounds having a triazine ring or a pyrimidine ring are preferable. These nitrogen-containing 6-membered ring compounds may have a substituent, and examples of the substituent in this case include an alkyl group having 1 to 6 carbon atoms and more preferably 1 to 3 carbon atoms, an alkoxy group having 1 to 6 carbon atoms and more preferably 1 to 3 carbon atoms, a hydroxyl group, a carboxy group, a mercapto group, an alkoxyalkyl group having 1 to 6 carbon atoms and more preferably 1 to 3 carbon atoms, and a hydroxyalkyl group having 1 to 6 carbon atoms and more preferably 1 to 3 carbon atoms.

Specific preferred examples of the nitrogen-containing 6-membered ring compound include triazine, methyl triazine, dimethyl triazine, hydroxyethyl triazine ring, pyrimidine, 4-methylpyrimidine, pyridine, and pyrroline.

—Organic Mercapto Compound—

Examples of the organic mercapto compound include an alkyl mercapto compound, an aryl mercapto compound, and a heterocyclic mercapto compound.

Examples of the alkyl mercapto compound include cysteine and thiomalic acid, examples of the aryl mercapto compound include thiosalicylic acid, and examples of the heterocyclic mercapto compound include 2-phenyl-1-mercaptotetrazole, 2-mercaptobenzoimidazole, 2-mercaptobenzothiazole, 2-mercaptobenzoxazole, 2-mercaptopyrimidine, 2,4-dimercaptopyrimidine, and 2-mercaptopyridine, and these compounds may have a substituent such as an alkyl group, a carboxy group, and a sun group.

Among the nitrogen-containing heterocyclic compound and the organic mercapto compound, benzotriazole, 5-methylbenzotriazole, 5-aminobenzotriazole, 5-chlorobenzotriazole, tetrazole, 5-aminotetrazole, 5-methyltetrazole, or 5-phenyl tetrazole is particularly preferable, and benzotriazole is most preferable.

The nitrogen-containing heterocyclic compound and the organic mercapto compound can be used alone or in combination of two or more kinds thereof.

The content (total content) of the nitrogen-containing heterocyclic compound and the organic mercapto compound in the pretreatment liquid is not particularly limited, but is preferably in a range of 0.1% by mass to 5.0% by mass and more preferably in a range of 0.1% by mass to 3.0% by mass with respect to the total amount of the pretreatment liquid.

(Surfactant)

The pretreatment liquid according to the embodiment of the present disclosure may contain at least one kind of surfactant. The surfactant can be used as a surface tension adjuster. Examples of the surface tension adjuster include nonionic surfactants.

Specific preferred examples of the surfactant include nonionic surfactants such as polyoxyethylene alkyl ether, polyoxyethylene alkyl allyl ether, polyoxyethylene fatty acid ester, sorbitan fatty acid ester, polyoxyethylene sorbitan fatty acid ester, polyoxyethylene alkylamine, glycerin fatty acid ester, and an oxyethylene oxypropylene block copolymer.

(Antifoaming Agent)

The pretreatment liquid according to the embodiment of the present disclosure may contain an antifoaming agent.

The antifoaming agent according to the embodiment of the present disclosure is not particularly limited, but a polysiloxane-based antifoaming agent can be used. Examples of the polysiloxane-based antifoaming agent include BYK-038.

(Other Aggregation Components)

The pretreatment liquid according to the embodiment of the present disclosure may have other aggregation components in addition to the acids described above as long as the effects of the present disclosure are not impaired. Examples of other aggregating agents include polyvalent metal salts and polyallylamine.

Examples of the polyvalent metal salts include salts of alkaline earth metals (such as magnesium and calcium) of Group 2 of the periodic table, salts of transition metals (such as lanthanum) of Group 3 of the periodic table, salts of cations (such as aluminum) of Group 13 of the periodic table, salts of lanthanides (such as neodymium), polyallylamine, and polyallylamine derivatives. Suitable examples of salts of metals include a nitrate, a chloride, and a thiocyanate.

The content of the polyvalent metal salts in the pretreatment liquid can be set to be, for example, in a range of 1% by mass to 10% by mass.

—Other Additives—

The pretreatment liquid according to the embodiment of the present disclosure can be formed to contain other additives in addition to the above-described components. Other additives in the pretreatment liquid are the same as other additives in the ink composition described below.

~Physical Properties of Pretreatment Liquid~

The surface tension of the pretreatment liquid is not particularly limited. For example, the surface tension thereof is preferably 25 mN/m or greater, more preferably in a range of 25 mN/m to 60 mN/m, and still more preferably in a range of 25 mN/m to 45 mN/m.

The surface tension of the pretreatment liquid can be adjusted by adding a surfactant to the treatment liquid.

Further, the surface tension of the pretreatment liquid is a value measured under a temperature condition of 25° C. using Automatic Surface Tensiometer CBVP-Z (manufactured by Kyowa Interface Science Co., Ltd.) according to a plate method.

Further, from the viewpoint of the aggregation rate of the ink composition, the pH (25° C.±1° C.) of the pretreatment liquid according to the embodiment of the present disclosure is preferably 6.0 or less, more preferably 5.5 or less, and still more preferably 5.0 or less.

Further, from the viewpoint of the member corrosiveness, the pH (25° C.±1° C.) of the pretreatment liquid according to the embodiment of the present disclosure is preferably 2.5 or greater, more preferably 3.0 or greater, still more preferably 3.5 or greater, and particularly preferably 4.0 or greater. From the viewpoints of the member corrosiveness and the aggregation rate of the ink composition, the pH (25° C.±1° C.) of the pretreatment liquid according to the embodiment of the present disclosure is preferably in a range of 4.0 to 5.0.

In the present disclosure, the pH can be measured at 25° C. using, for example, a pH meter (model number: HM-31, manufactured by DKK-TOA CORPORATION).

Further, from the viewpoint of the aggregation rate of the ink composition, the viscosity of the pretreatment liquid is preferably in a range of 1 mPa·s to 30 mPa·s, more preferably in a range of 1 mPa·s to 20 mPa·s, still more preferably in a range of 2 mPa·s to 15 mPa·s, and particularly preferably in a range of 2 mPa·s to 10 mPa·s. In addition, the viscosity is a value measured under a temperature condition of 25° C. using VISCOMETER TV-22 (manufactured by TOKI SAINGYO CO., LTD.).

<<Ink Set>>

An ink set according to the embodiment of the present disclosure includes the pretreatment liquid described in the present disclosure and an ink composition containing water and a colorant. Further, the pretreatment liquid is as described above, and the preferred embodiments are also the same as described above.

<Ink Composition>

The ink composition according to the embodiment of the present disclosure contains water and a colorant.

The ink composition may contain resin particles, a pigment dispersing agent (polymer dispersing agent), an organic solvent, a neutralizing agent, water, and other components as necessary.

(Colorant)

The ink composition according to the embodiment of the present disclosure contains a colorant.

As the colorant in the present disclosure, known dyes, pigments, and the like can be used without particular limitation. Among these, from the viewpoint of ink colorability, a colorant that is almost insoluble or sparingly soluble in water is preferable. Specific examples thereof include various pigments, dispersed dyes, oil-soluble dyes, and coloring agents that form J-aggregates. Among these, pigments are more preferable.

(Pigment)

It is preferable that the ink composition according to the embodiment of the present disclosure contains at least one kind of pigment.

The kind of the pigment is not particularly limited, and known organic pigments and inorganic pigments of the related art can be used as the pigment. Examples of the pigment include a polycyclic pigment such as an azo lake pigment, an azo pigment, a phthalocyanine pigment, a perylene pigment, a perinone pigment, an anthraquinone pigment, a quinacridone pigment, a dioxazine pigment, a diketopyrrolopyrrole pigment, a thioindigo pigment, an isoindolinone pigment, or a quinophthalone pigment; a basic lake dye or an acidic lake dye; an organic pigment such as a nitro pigment, a nitroso pigment, aniline black, or a daylight fluorescent pigment; and an inorganic pigment such as titanium oxide, iron oxide, or carbon black. Further, even pigments which are not described in Color Index can be used as long as the pigments can be dispersed in a water phase. Further, pigments which are surface-treated with a surfactant or a polymer dispersing agent and graft carbon can also be used.

Among these pigments, an azo pigment, a phthalocyanine pigment, an anthraquinone pigment, a quinacridone pigment, and a carbon black pigment are particularly preferable.

~Dispersing Agent~

In the ink composition of the present disclosure, it is preferable that the pigment is in the form of being dispersed by a dispersing agent.

Among examples of this form, particularly, the form in which the pigment is dispersed by a polymer dispersing agent, that is, the form in which at least a part of the pigment is coated with a polymer dispersing agent is preferable. Hereinafter, a pigment of which at least a part is coated with a polymer dispersing agent is referred to as a "resin-coated pigment".

As the dispersing agent, a polymer dispersing agent or a low-molecular-weight surfactant-type dispersing agent may be used. Further, as the polymer dispersing agent, a water-soluble polymer dispersing agent or a water-insoluble polymer dispersing agent may be used.

As the low-molecular-weight surfactant-type dispersing agent, surfactant-type dispersing agents described in paragraphs 0016 to 0020 of JP2010-188661A can be used.

Among the examples of the polymer dispersing agent, a hydrophilic polymer compound can be used as a water-soluble polymer dispersing agent.

As the water-soluble polymer dispersing agent, natural hydrophilic polymer compounds described in paragraphs 0021 and 0022 of JP2010-188661A can be used.

Further, a synthetic hydrophilic polymer compound can also be used as the water-soluble polymer dispersing agent.

Examples of the synthetic hydrophilic polymer compound include a vinyl-based polymer such as polyvinyl alcohol, polyvinylpyrrolidone, or polyvinyl methyl ether, an acrylic resin such as polyacrylamide, polyacrylic acid or an alkali metal salt thereof, or a water-soluble styrene acrylic resin, a water-soluble styrene maleic acid resin, a water-soluble vinyl naphthalene acrylic resin, a water-soluble vinyl naphthalene maleic acid resin, polyvinylpyrrolidone, polyvinyl alcohol, an alkali metal salt of a β-naphthalenesulfonic acid formalin condensate, and a polymer compound having a salt of a cationic functional group such as quaternary ammonium or an amino group, in a side chain.

Among these, from the viewpoint of the dispersion stability and the aggregating property of the pigment, a polymer compound containing a carboxy group is preferable, and a polymer compound containing a carboxy group, for example, an acrylic resin such as a water-soluble styrene acrylic resin, a water-soluble styrene maleic acid resin, a water-soluble vinyl naphthalene acrylic resin, or a water-soluble vinyl naphthalene maleic acid resin is particularly preferable.

As the water-insoluble dispersing agent among the examples of the polymer dispersing agent, a polymer having both a hydrophobic part and a hydrophilic part can be used. Examples of the water-insoluble dispersing agent include a styrene-(meth)acrylic acid copolymer, a styrene-(meth)acrylic acid-(meth)acrylic acid ester copolymer, a (meth)acrylic acid ester-(meth)acrylic acid copolymer, a polyethylene glycol (meth)acrylate-(meth)acrylic acid copolymer, a benzyl (meth)acrylate-(meth)acrylic acid-methyl (meth)acrylate copolymer, and a styrene-maleic acid copolymer.

The styrene-(meth)acrylic acid copolymer, the (meth)acrylic acid ester-(meth)acrylic acid copolymer, the polyethylene glycol (meth)acrylate-(meth)acrylic acid copolymer, and the styrene-maleic acid copolymer may be binary copolymers or ternary or higher copolymers.

Among these, as the polymer dispersing agent, a (meth)acrylic acid ester-meth)acrylic acid copolymer and a benzyl (meth)acrylate-(meth)acrylic acid-methyl (meth)acrylate copolymer are preferable, and a benzyl (methacrylate-(methacrylic, acid-methyl (meth)acrylate ternary copolymer is more preferable.

The term "(meth)acrylic acid" indicates acrylic acid or methacrylic acid, and the term "(meth)acrylate" indicates acrylate or methacrylate.

The weight-average molecular weight of the polymer dispersing agent is preferably in a range of 3000 to 200000, more preferably in a range of 5000 to 100000, still more preferably in a range of 5000 to 80000, and particularly preferably in a range of 10000 to 60000.

The acid value of the polymer dispersing agent is not particularly limited, but it is preferable that the acid value of the polymer dispersing agent is larger than the acid value of resin particles (preferably self-dispersing resin particles) described below which are used as necessary, from the viewpoint of the aggregating property.

Further, in the ink composition of the present disclosure, the mass ratio (pigment:dispersing agent) of the pigment to the dispersing agent is preferably in a range of 1:0.06 to 1:3, more preferably in a range of 1:0.125 to 1:2, and still more preferably in a range of 1:0.125 to 1:1.5.

The average particle diameter (the average particle diameter of the resin-coated pigment in the case of the resin-coated pigment, the same applies to hereinafter) of the pigment is preferably in a range of 10 nm to 200 nm, more preferably in a range of 10 nm to 150 nm, and still more preferably in a range of 10 nm to 110 nm. In a case where the average particle diameter is 200 nm or less, the color reproducibility is excellent, and the jetting property in a case where droplets are jetted according to an ink jet method is excellent. Further, in a case where the average particle diameter is 10 nm or greater, light fastness is excellent. Further, the particle size distribution of the pigment is not particularly limited, and any of wide particle size distribution or monodisperse particle size distribution may be used. In addition, two or more coloring materials having monodisperse particle size distribution may be mixed with each other and then used.

Further, the average particle diameter and the particle size distribution of the pigment are acquired by measuring the volume average particle diameter using a nanotrac particle size distribution measurement apparatus UPA-EX150 (manufactured by Nikkiso Co., Ltd.) according to a dynamic light scattering method.

In the present disclosure, from the viewpoint of the image density, the content of the pigment in the ink composition is preferably in a range of 1% by mass to 25% by mass, more preferably in a range of 2% by mass to 20% by mass, and particularly preferably in a range of 2% by mass to 10% by mass with respect to the total amount of the ink composition.

The pigment may be used alone or in combination of two or more kinds thereof.

(Water)

It is preferable that the ink composition of the present disclosure contains water. The content of water is not particularly limited, but is preferably in a range of 10% by mass to 99% by mass, more preferably in a range of 30% by mass to 80% by mass, and still more preferably in a range of 50% by mass to 70% by mass.

(Resin Particles)

It is preferable that the ink composition of the present disclosure contains at least one kind of resin particles.

The resin particles are different from the above-described polymer dispersing agent (polymer dispersing agent that covers at least a part of the pigment) and are present separately from the pigment.

The resin particles are aggregated by the organic acidic compound in the pretreatment liquid described above. In this manner, the fixing property of the image and the aggregation rate are further improved.

By using the ink composition containing the resin particles and the pretreatment liquid containing the specific polymer compound, the aggregation rate is suppressed to some extent so that the spread of the ink droplets is promoted, and thus a decrease in uniformity of the image due to insufficient spread of the ink droplets is further suppressed.

It is preferable that the resin particles are water-insoluble or sparingly water-soluble resin particles.

The expression "water-insoluble or sparingly water-soluble" indicates that the dissolution amount of a resin is 15 g or less in a case where the resin is dissolved in 100 g of water at 25° C. after being dried at 105° C. for 2 hours. From the viewpoint of improving the continuous jetting property and jetting stability of the ink, the dissolution amount thereof is preferably 10 g or less, more preferably 5 g or less, and still more preferably 1 g or less. The dissolution amount is a dissolution amount obtained by performing neutralization at a neutralization degree of 100% with sodium hydroxide or acetic acid depending on the kind of a salt-forming group of the water-insoluble polymer.

As the resin particles, any of thermoplastic, thermosetting, or modified resin particles may be used, and examples thereof include particles of resins having anionic groups such as an acrylic resin, an epoxy resin, a polyurethane resin, a polyether resin, a polyamide resin, an unsaturated polyester resin, a phenolic resin, a silicone resin, a fluorine resin, a polyvinyl resin such as vinyl chloride, vinyl acetate, polyvinyl alcohol, or polyvinyl butyral, a polyester resin such as an alkyd resin or a phthalic acid resin, an amino-based resin such as a melamine resin, a melamine formaldehyde resin, an aminoalkyd co-condensation resin, a urea resin, or copolymers or mixtures thereof. Among these, the anionic acrylic resin is obtained by polymerizing acrylic monomers (anionic group-containing acrylic monomers) containing an anionic group and other monomers which can be copolymerized with anionic group-containing acrylic monomers as necessary, in a solvent. Examples of the anionic group-containing acrylic monomer include an acrylic monomer containing one or more selected from the group consisting of a carboxy group, a sulfonic acid group, and a phosphonic acid group. Among these, acrylic monomers (such as acrylic acid, methacrylic acid, crotonic acid, ethacrylic acid, propylacrylic acid, isopropylacrylic acid, itaconic acid, and fumaric acid) containing a carboxy group are preferable, and acrylic acid and methacrylic acid are particularly preferable.

From the viewpoints of the jetting stability and the liquid stability (particularly dispersion stability) of a system containing a pigment, it is preferable that the resin particles which can be used in the present disclosure are self-dispersing resin particles (self-dispersing resin particles). Here, the self-dispersing resin indicates a water-insoluble polymer which may be in a state of being dispersed in an aqueous medium by a functional group (particularly an acidic group or a salt thereof) included in a polymer in a case where the polymer is set to be in a dispersion state using a phase-transfer emulsification method in the absence of a surfactant.

The dispersion state includes both an emulsified state (emulsion) formed by a water-insoluble polymer being dispersed in an aqueous medium in a liquid state and a dispersion state (suspension) formed by a water-insoluble polymer being dispersed in an aqueous medium in a solid state.

In addition, the aqueous medium indicates a medium containing water. The aqueous medium may contain a hydrophilic organic solvent as necessary. The aqueous medium is formed of preferably water and 0.2% by mass or less of a hydrophilic organic solvent with respect to the water and more preferably water.

From the viewpoints of the aggregation rate and the fixing property in a case where the self-dispersing resin is contained in the ink composition, self-dispersing resin particles in which a water-insoluble polymer can be dispersed in a solid state are preferable as the self-dispersing resin.

As a method of obtaining the self-dispersing resin in an emulsified or dispersion state, that is, a method of preparing an aqueous dispersion of the self-dispersing resin particles, a phase-transfer emulsification method is exemplified.

As the phase-transfer emulsification method, a method of dissolving or dispersing a self-dispersing resin in a solvent (for example, a water-soluble organic solvent), putting the resultant in water without adding a surfactant thereto, stirring and mixing the solution in a state in which a salt-forming group (for example, an acidic group) contained in the self-dispersing resin is neutralized, and removing the solvent therefrom to obtain an aqueous dispersion in an emulsified or dispersion state is exemplified.

Further, a stable emulsified or dispersion state of the self-dispersing resin indicates a state (that is, a state in which precipitation cannot be visually confirmed) in which an emulsified or dispersion state is stably present at 25° C. for at least one week even after a solution obtained by dissolving 30 g of a water-insoluble polymer in 70 g of an organic solvent (for example, methyl ethyl ketone), a neutralizing agent (sodium hydroxide in a case where the salt-forming group is anionic and acetic acid in a case where the salt-forming group is cationic) which is capable of neutralizing a salt-forming group of the water-insoluble polymer at a neutralization degree of 100%, and 200 g of water are mixed and stirred (device: stirring device provided with stirring blades, rotation speed of 200 rpm, 30 minutes, 25° C.) and then the organic solvent is removed from the mixed solution.

In addition, the stability of the emulsified or dispersion state of the self-dispersing resin can be confirmed by performing a sedimentation acceleration test using centrifugation. The stability confirmed by the sedimentation acceleration test using centrifugation can be evaluated by adjusting the concentration of solid contents of the aqueous dispersion of resin particles obtained by the above-described method to 25% by mass, performing centrifugation at 12000 rpm for one hour, and measuring the concentration of solid contents of the supernatant after the centrifugation.

In a case where the ratio of the concentration of solid contents after the centrifugation to the concentration of solid contents before the centrifugation is large (in a case where the numerical value is close to 1), this means that sedimentation of resin particles due to centrifugation does not occur, that is, the aqueous dispersion of the resin particles is more stable. In the present disclosure, the ratio between the concentrations of solid contents before and after the centrifugation is preferably 0.8 or greater, more preferably 0.9 or greater, and particularly preferably 0.95 or greater.

In a case where the self-dispersing resin is in the dispersion state, the content of a water-soluble component showing water solubility is preferably 10% by mass or less, more preferably 8% by mass or less, and still more preferably 6% by mass or less. In a case where the content of the water-soluble component is set to 10% by mass or less, it is possible to effectively suppress swelling of resin particles and fusion welding of resin particles and to more stably maintain the dispersion state.

Further, an increase in viscosity of the aqueous ink composition can be suppressed, and the jetting stability is more excellent in a case where the aqueous ink composition is applied to an ink jet method.

Here, the water-soluble component is a compound to be contained in the self-dispersing resin, which is a compound to be dissolved in water in a case where the self-dispersing resin is set to be in the dispersion state. The water-soluble component is a water-soluble compound which is created as a by-product or mixed in a case where the self-dispersing resin is produced.

A main chain skeleton of the water-insoluble polymer is not particularly limited, and for example, a vinyl polymer or a condensation type polymer (such as an epoxy resin, polyester, polyurethane, polyamide, cellulose, polyether, polyurea, polyimide, or polycarbonate) can be used. Among these, a vinyl polymer is particularly preferable.

Suitable examples of the vinyl polymer and a monomer constituting the vinyl polymer include those described in JP2001-181549A and JP2002-088294A. Further, a vinyl polymer obtained by introducing a dissociable group to a terminal of a polymer chain by performing radical polymerization on a vinyl monomer using a chain transfer agent, a polymerization initiator, and an iniferter which have a dissociable group (or a substituent which can be induced to a dissociable group) or performing ion polymerization using a compound containing a dissociable group (or a substituent which can be induced to a dissociable group) in either of an initiator or a terminator can be used.

Further, suitable examples of the condensation type polymer and a monomer constituting the condensation type polymer include those described in JP2001-247787A.

From the viewpoint of self-dispersibility, it is preferable that the self-dispersing resin particles which can be used in the present disclosure contain a water-insoluble polymer which has a hydrophilic constitutional unit and a constitutional unit derived from an aromatic group-containing monomer or a cyclic aliphatic group-containing monomer.

The "hydrophilic constitutional unit" is not particularly limited as long as the constitutional unit is derived from a hydrophilic group-containing monomer, and the constitutional unit may be a constitutional unit derived from one hydrophilic group-containing monomer or a constitutional unit derived from two or more hydrophilic group-containing monomers. The hydrophilic group is not particularly limited and may be a dissociable group or a nonionic hydrophilic group.

From the viewpoints of the stability of the formed emulsified or dispersion state and promoting self-dispersion, as the hydrophilic group, a dissociable group is preferable and an anionic dissociable group is more preferable. Examples of the dissociable group include a carboxy group, a phosphoric acid group, and a sulfonic acid group. Among these, from the viewpoint of the fixing property in a case of constituting the ink composition, a carboxy group is preferable.

From the viewpoint of the self-dispersibility and the aggregating property, as the hydrophilic group-containing monomer, a dissociable group-containing monomer is preferable, and a dissociable group-containing monomer that contains a dissociable group and an ethylenically unsaturated bond is more preferable.

Examples of the dissociable group-containing monomer include an unsaturated carboxylic acid monomer, an unsaturated sulfonic acid monomer, and an unsaturated phosphoric acid monomer.

Specific examples of the unsaturated carboxylic acid monomer include acrylic acid, methacrylic acid, crotonic acid, itaconic acid, maleic acid, fumaric acid, citraconic acid, and 2-methacryloyloxymethylsuccinic acid.

Specific examples of the unsaturated sulfonic acid monomer include styrenesulfonic acid, 2-acrylamido-2-methylpropanesulfonic acid, 3-sulfopropyl (meth)acrylate, and bis-(3-sulfopropyl)-itaconic acid ester.

Specific examples of the unsaturated phosphoric acid monomer include vinylphosphonic acid, vinyl phosphate, bis(methacryloxyethyl) phosphate, diphenyl-2-acryloxyethyl phosphate, diphenyl-2-methacryloxyethyl phosphate, and dibutyl-2-acryloxyethyl phosphate.

Among the dissociable group-containing monomers, from the viewpoints of the dispersion stability and the jetting stability, an unsaturated carboxylic acid monomer is preferable, and acrylic acid and methacrylic acid are more preferable.

From the viewpoints of the self-dispersibility and the aggregation rate in a case where the self-dispersing resin particles are brought into contact with the pretreatment liquid, it is preferable that the self-dispersing resin particles contain a polymer containing a carboxy group and more preferable that the self-dispersing resin particles contain a polymer which contains a carboxy group and has an acid value of 25 mgKOH/g to 100 mgKOH/g.

Further, from the viewpoints of the self-dispersibility and the aggregation rate in a case where the self-dispersing resin particles are brought into contact with the pretreatment liquid, the acid value is more preferably in a range of 25 mgKOH/g to 80 mgKOH/g and particularly preferably in a range of 30 mgKOH/g to 65 mgKOH/g.

In particular, in a case where the acid value is 25 or greater, the stability of the self-dispersibility is satisfactory. Further, in a case where the acid value is 100 or less, the aggregating property is improved.

The aromatic group-containing monomer is not particularly limited as long as the aromatic group-containing monomer is a compound containing an aromatic group and a polymerizable group. The aromatic group may be a group derived from an aromatic hydrocarbon or a group derived from an aromatic heterocycle. In the present disclosure, from the viewpoint of stability of the particle shape in the aqueous medium, it is preferable that the aromatic group is an aromatic group derived from an aromatic hydrocarbon.

Further, the polymerizable group may be a condensation polymerizable group or an addition polymerizable group. In the present disclosure, from the viewpoint of the stability of the particle shape in the aqueous medium, as the polymerizable group, an addition polymerizable group is preferable and a group having an ethylenically unsaturated bond is more preferable.

It is preferable that the aromatic group-containing monomer is a monomer containing an aromatic group derived from an aromatic hydrocarbon and an ethylenically unsaturated bond. The aromatic group-containing monomer may be used alone or in combination of two or more kinds thereof.

Examples of the aromatic group-containing monomer include phenoxyethyl (meth)acrylate, benzyl (meth)acrylate, phenyl (meth)acrylate, and a styrene-based monomer. Among these, from the viewpoints of the balance between hydrophilicity and hydrophobicity of the polymer chain and the ink fixing property, an aromatic group-containing (meth) acrylate monomer is preferable, at least one selected from phenoxyethyl (meth)acrylate, benzyl (meth)acrylate, or phenyl (meth)acrylate is more preferable, and phenoxyethyl (meth)acrylate and benzyl (meth)acrylate are still more preferable.

In addition, the term "(meth)acrylate" indicates acrylate or methacrylate.

As the cyclic aliphatic group-containing monomer, a monomer containing a cyclic aliphatic group derived from a cyclic aliphatic hydrocarbon and an ethylenically unsaturated bond is preferable and a cyclic aliphatic group-containing (meth)acrylate monomer (hereinafter, also referred to as alicyclic (meth)acrylate) is more preferable.

The alicyclic (meth)acrylate is a compound which includes a constitutional site derived from (meth)acrylic acid and a constitutional site derived from alcohol and has a structure containing at least one substituted or unsubstituted alicyclic hydrocarbon group (cyclic aliphatic group) in the constitutional site derived from alcohol. Further, the alicyclic hydrocarbon group may be the constitutional site derived from alcohol or may be bonded to the constitutional site derived from alcohol through a linking group.

The alicyclic hydrocarbon group is not particularly limited as long as the alicyclic hydrocarbon group is a hydrocarbon group containing a cyclic non-aromatic hydrocarbon group, and examples thereof include a monocyclic hydrocarbon group, a bicyclic hydrocarbon group, and a tricyclic or higher polycyclic hydrocarbon group. Examples of the alicyclic hydrocarbon group include a cycloalkyl group such as a cyclopentyl group or a cyclohexyl group, a cycloalkenyl group, a bicyclohexyl group, a norbornyl group, an isobornyl group, a dicyclopentanyl group, a dicyclopentenyl group, an adamantyl group, a decahydronaphthalenyl group, a perhydrofluorenyl group, a tricycle$[5.2.1.0^{2,6}]$decanyl group, and bicyclo[4.3.0]nonane.

The alicyclic hydrocarbon group may further include a substituent. Examples of the substituent include an alkyl group, an alkenyl group, an aryl group, an aralkyl group, an alkoxy group, a hydroxyl group, a primary amino group, a secondary amino group, a tertiary amino group, an alkyl or arylcarbonyl group, and a cyano group. In addition, the alicyclic hydrocarbon group may form a fused ring. In the present disclosure, from the viewpoints of the viscosity and the solubility, the number of carbon atoms of the alicyclic hydrocarbon group portion in the alicyclic hydrocarbon group is preferably in a range of 5 to 20.

Specific examples of the alicyclic (meth)acrylate will be described below, but the present disclosure is not limited thereto.

Examples of the monocyclic (meth)acrylate include cycloalkyl (meth)acrylate containing a cycloalkyl group having 3 to 10 carbon atoms, such as cyclopropyl (meth)acrylate, cyclobutyl (meth)acrylate, cyclopentyl (meth)acrylate, cyclohexyl (meth)acrylate, cycloheptyl (meth)acrylate, cyclooctyl (meth)acrylate, cyclononyl (meth)acrylate, or cyclodecyl (meth)acrylate.

Examples of the bicyclic (meth)acrylate include isobornyl (meth)acrylate and norbornyl (meth)acrylate.

Examples of the tricyclic (meth)acrylate include adamantyl (meth)acrylate, dicyclopentanyl (meth)acrylate, and dicyclopentenyloxyethyl (meth)acrylate.

These may be used alone or in combination of two or more kinds thereof.

Among these, from the viewpoints of the dispersion stability, the fixing property, and the blocking resistance of the self-dispersing resin particles, at least one of bicyclic (meth)acrylate or tricyclic or higher polycyclic (meth)acrylate is preferable, and at least one selected from isobornyl (meth)acrylate, adamantyl (meth)acrylate, or dicyclopentanyl (meth)acrylate is more preferable.

As the self-dispersing resin, an acrylic resin having a constitutional unit derived from a (meth)acrylate monomer is preferable, an acrylic resin having a constitutional unit derived from an aromatic group-containing (meth)acrylate monomer or alicyclic (meth)acrylate is more preferable, and an acrylic resin which has a constitutional unit derived from an aromatic group-containing (meth)acrylate monomer or alicyclic (meth)acrylate and whose content is in a range of 10% by mass to 95% by mass with respect to the total mass of the resin is still more preferable. In a case where the content of the constitutional unit derived from an aromatic group-containing (meth)acrylate monomer or alicyclic (meth)acrylate is in a range of 10% by mass to 95% by mass with respect to the total mass of the resin, the stability of self emulsification or the dispersion state is improved, and an increase in viscosity of the ink can be further suppressed.

From the viewpoints of the stability of the self-dispersion state, stabilization of the particle shape in the aqueous medium using the hydrophobic interaction between aromatic rings or alicycles, and a decrease in amount of water-soluble components due to appropriate hydrophobization of particles, the content of the constitutional unit derived from an aromatic group-containing (meth)acrylate monomer or alicyclic (meth)acrylate is more preferably in a range of 15% by mass to 90% by mass, still more preferably in a range of 15% by mass to 80% by mass, and particularly preferably in a range of 25% by mass to 70% by mass with respect to the total mass of the resin.

The self-dispersing resin can formed of a constitutional unit derived from an aromatic group-containing monomer or a cyclic aliphatic group-containing monomer and a constitutional unit derived from a dissociable group-containing monomer. Further, the self-dispersing resin may further have other constitutional units as necessary.

The monomers forming other constitutional units described above are not particularly limited as long as the monomers can be copolymerized with the aromatic group-containing monomer and the dissociable group-containing monomer. Among these, from the viewpoints of flexibility of a polymer skeleton or ease of controlling the glass transition temperature (Tg), an alkyl group-containing monomer is preferable.

Examples of the alkyl group-containing monomer include alkyl(meth)acrylate such as methyl (meth)acrylate, ethyl (meth)acrylate, isopropyl (meth)acrylate, n-propyl (meth)acrylate, n-butyl (meth)acrylate, isobutyl (meth)acrylate, t-butyl (meth)acrylate, hexyl (meth)acrylate, or ethylhexyl (meth)acrylate; an ethylenically unsaturated monomer containing a hydroxyl group such as hydroxymethyl (meth)acrylate, 2-hydroxyethyl (meth)acrylate, 2-hydroxypropyl (meth)acrylate, 4-hydroxybutyl (meth)acrylate, hydroxypentyl (meth)acrylate, or hydroxyhexyl (meth)acrylate; dialkylaminoalkyl (meth)acrylate such as dimethylaminoethyl (meth)acrylate; and (meth)acrylamide, for example, N-hydroxyalkyl (meth)acrylamide such as N-hydroxymethyl (meth)acrylamide, N-hydroxyethyl (meth)acrylamide, or N-hydroxybutyl (meth)acrylamide, and N-alkoxyalkyl (meth)acrylamide such as N-methoxymethyl (meth)acrylamide, N-ethoxymethyl (meth)acrylamide, N-(n-, iso)butoxymethyl (meth)acrylamide, N-methoxyethyl (meth)acrylamide, N-ethoxyethyl (meth)acrylamide, or N-(n-, iso) butoxyethyl (meth)acrylamide.

The molecular weight of the water-insoluble polymer that forms the self-dispersing resin particles is preferably in a range of 3000 to 200000, more preferably in a range of 5000 to 150000, and still more preferably in a range of 10000 to 100000 in terms of the weight-average molecular weight. In a case where the weight-average molecular weight thereof is 3000 or greater, the amount of water-soluble components can be effectively suppressed. Further, in a case where the weight-average molecular weight thereof is 200000 or less, the self-dispersion stability can be improved.

The weight-average molecular weight can be measured by gel permeation chromatography (GPC). The measurement according to GPC is performed using HLC-8020GPC (manufactured by Tosoh Corporation), three columns of TSKgel, Super Multipore HZ-H (manufactured by Tosoh Corporation, 4.6 mmID×15 cm), and tetrahydrofuran (THF) as an eluent. Further, the measurement is performed under conditions of a sample concentration of 0.45% by mass, a flow rate of 0.35 ml/min, a sample injection volume of 10 µl, and a measurement temperature of 40° C. using an IR detector. Further, the calibration curve is prepared using eight samples of "F-40", "F-20", "F-4", "F-1", "A-5000", "A-2500", "A-1000", and "n-propylbenzene" which are "Standard Samples TSK standard, polystyrene" (manufactured by Tosoh Corporation).

From the viewpoint of controlling hydrophilicity and hydrophobicity of the polymer, it is preferable that the water-insoluble polymer that forms the self-dispersing resin particles has a structural unit derived from an aromatic group-containing (meth)acrylate monomer (preferably a structural unit derived from phenoxyethyl (meth)acrylate and/or a structural unit derived from benzyl (meth)acrylate) or a cyclic aliphatic group-containing monomer (preferably alicyclic (meth)acrylate) at a copolymerization ratio of 15% by mass to 80% by mass with respect to the total mass of the self-dispersing resin particles.

In addition, from the viewpoint of controlling hydrophilicity and hydrophobicity of the polymer, it is preferable that the water-insoluble polymer has a constitutional unit derived from an aromatic group-containing (meth)acrylate monomer or an alicyclic (meth)acrylate monomer at a copolymerization ratio of 15% by mass to 80% by mass, a constitutional unit derived from a carboxy group-containing monomer, and a constitutional unit derived from an alkyl group-containing monomer (preferably a structural unit derived from alkyl ester of (meth)acrylic acid) and more preferable that the water-insoluble polymer has a structural unit derived from phenoxyethyl (meth)acrylate and/or a constitutional unit derived from benzyl (meth)acrylate at a copolymerization ratio of 15% by mass to 80% by mass, a constitutional unit derived from a carboxy group-containing monomer, and a constitutional unit derived from an alkyl group-containing monomer (preferably a structural unit derived from alkyl ester of (meth)acrylic acid having 1 to 4 carbon atoms).

Further, it is preferable that the water-insoluble polymer has an acid value of 25 to 100 and a weight-average molecular weight of 3000 to 200000 and more preferable that the water-insoluble polymer has an acid value of 25 to 95 and a weight-average molecular weight of 5000 to 150000.

Hereinafter, exemplary compounds B-01 to B-23 will be described as specific examples of the water-insoluble polymer that forms the self-dispersing resin particles, but the present disclosure is not limited thereto. Further, the mass ratios of copolymer components are shown in the parentheses.

B-01: phenoxyethyl acrylate/methyl acrylate/acrylic acid copolymer (50/45/5)

B-02: phenoxyethyl acrylate/benzyl methacrylate/isobutyl methacrylate/methacrylic acid copolymer (30/35/29/6)

B-03: phenoxyethyl methacrylate/isobutyl methacrylate/methacrylic acid copolymer (50/44/6)

B-04: phenoxyethyl acrylate/methyl methacrylate/ethyl acrylate/acrylic acid copolymer (30/55/10/5)

B-05: benzyl methacrylate/isobutyl methacrylate/methacrylic acid copolymer (35/59/6)

B-06: styrene/phenoxyethyl acrylate/methyl methacrylate/acrylic acid copolymer (10/50/35/5)

B-07: benzyl acrylate/methyl methacrylate/acrylic acid copolymer (55/40/5)

B-08: phenoxyethyl methacrylate/benzyl acrylate/methacrylic acid copolymer (45/47/8)

B-09: styrene/phenoxyethyl acrylate/butyl methacrylate/acrylic acid copolymer (5/48/40/7)

B-10: benzyl methacrylate/isobutyl methacrylate/cyclohexyl methacrylate/methacrylic acid copolymer (35/30/30/5)

B-11: phenoxyethyl acrylate/methyl methacrylate/butyl acrylate/methacrylic acid copolymer (12/50/30/8)

B-12: benzyl acrylate/isobutyl methacrylate/acrylic acid copolymer (93/2/5)

B-13: styrene/phenoxyethyl methacrylate/butyl acrylate/acrylic acid copolymer (50/5/20/25)

B-14: styrene/butyl acrylate/acrylic acid copolymer (62/35/3)

B-15: methyl methacrylate/phenoxyethyl acrylate/acrylic acid copolymer (45/51/4)

B-16: methyl methacrylate/phenoxyethyl acrylate/acrylic acid copolymer (45/49/6)

B-17: methyl methacrylate/phenoxyethyl acrylate/acrylic acid copolymer (45/48/7)

B-18: methyl methacrylate/phenoxyethyl acrylate/acrylic acid copolymer (45/47/8)

B-19: methyl methacrylate/phenoxyethyl acrylate/acrylic acid copolymer (45/45/10)

B-20: methyl methacrylate/isobornyl methacrylate/acrylic acid copolymer (20/72/8)

B-21: methyl methacrylate/isobornyl methacrylate/acrylic acid copolymer (40/52/8)

B-22: methyl methacrylate/isobornyl methacrylate/dicyclopentanyl methacrylate/methacrylic acid copolymer (20/62/10/8)

B-23: methyl methacrylate/dicyclopentanyl methacrylate/methacrylic acid copolymer (20/72/8)

A method of producing the water-insoluble polymer constituting the self-dispersing resin particles is not particularly limited, and examples thereof include a method of performing emulsion polymerization in the presence of a polymerizable surfactant and covalently bonding a surfactant and a water-insoluble polymer to each other; a solution polymerization method of performing polymerization on a monomer mixture that contains the hydrophilic group-containing monomer and the aromatic group-containing monomer or the alicyclic group-containing monomer; and a method of copolymerization using a known polymerization method such as a bulk polymerization method. Among these polymerization methods, from the viewpoints of aggregation rate and jetting stability in a case of jetting the ink composition, the solution polymerization method is preferable and a solution polymerization method using an organic solvent is more preferable.

From the viewpoint of the aggregation rate, it is preferable that the self-dispersing resin particles contain a polymer synthesized in an organic solvent, the polymer contains an anionic group (a carboxy group), a part or the entirety of the anionic group (a carboxy group) of the polymer (preferably the acid value is in a range of 20 to 100) is neutralized, and the neutralized group is prepared as a polymer dispersion using water as a continuous phase.

In other words, it is preferable that the self-dispersing resin particles are produced by performing a step of synthesizing a polymer in an organic solvent and a dispersion step of obtaining an aqueous dispersion in which at least a part of the anionic group (a carboxy group) of the polymer is neutralized.

It is preferable that the dispersion step includes the following steps (1) and (2).

Step (1): a step of stirring a mixture that contains a polymer (water-insoluble polymer), an organic solvent, a neutralizing agent, and an aqueous medium Step (2): a step of removing the organic solvent from the mixture It is preferable that the step (1) is a treatment of dissolving the polymer (water-insoluble polymer) in the organic solvent, gradually adding a neutralizing agent and an aqueous medium thereto, and mixing and stirring the solution to obtain a dispersion material.

The self-dispersing resin particles having a particle diameter with excellent storage stability can be obtained by adding a neutralizing agent and an aqueous medium to the water-insoluble polymer solution dissolved in an organic solvent, without requiring strong shear force.

The method of stirring the mixture is not particularly limited, and a mixing and stirring device which is typically used and a disperser such as an ultrasonic disperser or a high pressure homogenizer can be used as necessary.

Further, in the step (2), an aqueous dispersion of the self-dispersing resin particles can be obtained by distilling the organic solvent using a known method, for example, distillation under reduced pressure from the dispersion material obtained in the step (1) and performing phase transfer into a water system. The organic solvent in the obtained aqueous dispersion is substantially removed and the amount of organic solvent is preferably 0.2% by mass or less and more preferably 0.1% by mass or less.

Preferred examples of the organic solvent include an alcohol-based solvent, a ketone-based solvent, and an ether-based solvent. As the organic solvent, organic solvents exemplified in paragraph 0059 of JP2010-188661A can be used.

As the neutralizing agent, neutralizing agents exemplified in paragraphs 0060 and 0061 of JP2010-188661A can be used.

The average particle diameter of the resin particles (particularly, self-dispersing resin particles) which can be used in the present disclosure is preferably in a range of 10 nm to 400 nm, more preferably in a range of 10 nm to 200 nm, still more preferably in a range of 10 nm to 100 nm, and particularly preferably in a range of 10 nm to 50 nm in terms of the volume average particle diameter. In a case where the volume average particle diameter thereof is 10 nm or greater, the production suitability is improved. Further, the volume average particle diameter thereof is 400 nm or less, the storage stability is improved. Moreover, the particle size distribution of the resin particles is not particularly limited, and any of resin particles having wide particle size distribution and resin particles having monodisperse particle size distribution may be used. In addition, the resin particles may be used in the form of a mixture of two or more kinds thereof.

Further, the average particle diameter and the particle size distribution of the resin particles are acquired by measuring the volume average particle diameter using a nanotrac particle size distribution measurement apparatus UPA-EX150 (manufactured by Nikkiso Co., Ltd.) according to a dynamic light scattering method.

In a case where the ink composition in the present disclosure contains resin particles (preferably self-dispersing resin particles), the ink composition may contain only one kind of resin particles (preferably self-dispersing resin particles) or two or more kinds of resin particles.

In a case where the ink composition of the present disclosure contains resin particles (preferably self-dispersing resin particles), from the viewpoint of glossiness of an image, the content (total content) of the resin particles (preferably self-dispersing resin particles) in the ink composition is preferably in a range of 1% by mass to 30% by mass and more preferably in a range of 3% by mass to 15% by mass with respect to the total amount of the ink composition.

(Organic Solvent)

It is more preferable that the ink composition of the present disclosure further contains at least one organic solvent (preferably a water-soluble organic solvent). In a case where the organic solvent contains particularly a water-soluble organic solvent, it is possible to prevent the ink composition from being dried and to promote permeation of the ink composition.

In a case where the water-soluble organic solvent is used as an anti-drying agent, it is possible to effectively prevent nozzle clogging which may occur due to the drying of the ink at an ink jet port in a case where the ink composition is jetted according to an ink jet method for recording an image.

In order to prevent the ink composition from being dried, a water-soluble organic solvent having a lower vapor pressure than that of water is preferable. Specific examples of a suitable water-soluble organic solvent for the purpose of preventing the ink composition from being dried include polyhydric alcohols such as ethylene glycol, propylene glycol, diethylene glycol, polyethylene glycol, thiodiglycol, dithiodiglycol, 2-methyl-1,3-propanediol, 1,2,6-hexanetriol, an acetylene glycol derivative, glycerin, and trimethylol propane; lower alkyl ethers of polyhydric alcohol such as ethylene glycol monomethyl (or ethyl) ether, diethylene glycol monomethyl (or ethyl) ether, triethylene glycol monoethyl (or butyl) ether, and tripropylene glycol monomethyl (or ethyl) ether; heterocycles such as 2-pyrrolidone, N-methyl-2-pyrrolidone, 1,3-dimethyl-2-imidazolidinone, and N-ethyl morpholine; sulfur-containing compounds such as sulfolane, dimethyl sulfoxide, and 3-sulfolene; polyfunctional compounds such as diacetone alcohol and diethanolamine; and urea derivatives.

Among these, polyhydric alcohol such as glycerin or diethylene glycol is preferable. Further, these may be used alone or in combination of two or more kinds thereof. It is preferable that the ink composition contains 10% by mass to 50% by mass of these water-soluble organic solvents.

In order to promote permeation of the ink composition, a water-soluble organic solvent is suitably used from the viewpoint of satisfactorily permeating the ink composition into the recording medium. Specific examples of the water-soluble organic solvent suitable for promoting permeation include alcohols such as ethanol, isopropanol, butanol, di(t-ri)ethylene glycol monobutyl ether, tripropylene glycol monomethyl (or ethyl) ether, and 1,2-hexanediol, sodium lauryl sulfate, sodium oleate, and nonionic surfactants. In a case where the ink composition contains 5% by mass to 30% by mass of these, excellent effects are obtained. Further, it is preferable that the addition amount of these water-soluble organic solvents is in a range where bleeding of printed characters and images or page omission (print through) does not occur.

Further, the water-soluble organic solvent can be used to adjust the viscosity other than the applications described above. Specific examples of the water-soluble organic solvent which can be used to adjust the viscosity include alcohol (for example, methanol, ethanol, propanol, isopropanol, butanol, isobutanol, sec-butanol, t-butanol, pentanol, hexanol, cyclohexanol, or benzyl alcohol), polyhydric alcohols (for example, ethylene glycol, diethylene glycol, triethylene glycol, polyethylene glycol, propylene glycol, dipropylene glycol, polypropylene glycol, butylene glycol, hexanediol, pentanediol, glycerin, hexanetriol, and thiodiglycol), a glycol derivative (for example, ethylene glycol monomethyl ether, ethylene glycol monoethyl ether, ethylene glycol monobutyl ether, diethylene glycol monomethyl ether, diethylene glycol monobutyl ether, propylene glycol monomethyl ether, propylene glycol monobutyl ether, dipropylene glycol monomethyl ether, tripropylene glycol monomethyl ether, tripropylene glycol monoethyl ether, triethylene glycol monomethyl ether, ethylene glycol diacetate, ethylene glycol monomethyl ether acetate, triethylene glycol monomethyl ether, triethylene glycol monoethyl ether, or ethylene glycol monophenyl ether), amine (for example, ethanolamine, diethanolamine, triethanolamine, N-methyl diethanolamine, N-ethyl diethanolamine, morpholine, N-ethyl morpholine, ethylene diamine, diethylene triamine, triethylene tetramine, polyethyleneimine, or tetramethyl propylene diamine), and other polar solvents (for example, formamide, N,N-dimethyl formamide, N,N-dimethyl acetamide, dimethyl sulfoxide, solfolane, 2-pyrrolidone, N-methyl-2-pyrrolidone, N-vinyl-2-pyrrolidone, 2-oxazolidone, 1,3-dimethyl-2-imidazolidinone, acetonitrile, and acetone).

Further, the water-soluble organic solvents may be used alone or in the form of a mixture of two or more kinds thereof.

(Surfactant)

It is preferable that the ink composition of the present disclosure contains at least one surfactant.

Examples of the surfactant include a nonionic surfactant, a cationic surfactant, an anionic surfactant, and a betaine surfactant. From the viewpoint of the aggregation rate, an anionic surfactant or a nonionic surfactant is preferable.

From the viewpoint of satisfactorily jetting the ink composition using an ink jet method, it is preferable that the amount of the surfactant to be contained in the ink composition is set such that the surface tension of the ink composition can be adjusted to be in a range of 25 mN/m to 40 mN/m. Among the examples of the ranges, it is preferable that the content of the surfactant is set such that the surface tension thereof can be adjusted to be in a range of 27 mN/m to 37 mN/m.

Further, these surfactants can be used as an antifoaming agent. As the surfactants, chelating agents typified by a fluorine-based compound, a silicone-based compound, and EDTA can be used.

(Polymerizable Compound and Polymerization Initiator)

The ink composition of the present disclosure may further contain a polymerizable compound in addition to the components described above. The polymerizable compound is a compound containing a polymerizable group, and the polymerizable group may be a condensation polymerizable group or an addition polymerizable group. From the viewpoint of stability of the particle shape in the aqueous medium, as the polymerizable group, an addition polymerizable group is preferable and a group having an ethylenically unsaturated bond is more preferable.

Further, the ink composition of the present disclosure may contain a polymerization initiator in addition to the polymerizable compound. Examples of the polymerization initiator include a thermal polymerization initiator and a photopolymerization initiator.

(Other Additives)

The ink composition of the present disclosure may further contain other additives in addition to the components described above. Examples of other additives include known additives such as a discoloration preventer, an emulsification stabilizer, a penetration enhancer, an ultraviolet absorbing agent, a preservative, an antibacterial agent, a pH adjusting agent, an antifoaming agent, a viscosity adjusting agent, a dispersion stabilizer, a rust inhibitor, and a chelating agent. These various additives may be directly added after preparation of the ink composition or added during the preparation of the ink composition.

As the pH adjusting agent, a neutralizing agent (an organic base or inorganic alkali) can be used.

From the viewpoint of improving the storage stability of the ink composition, it is preferable that the pH adjusting agent is added to the ink composition such that the pH of the ink composition is adjusted to be in a range of 6 to 10 and more preferable that the pH adjusting agent is added to the ink composition such that the pH of the ink composition is adjusted to be in a range of 7 to 10.

From the viewpoints of jetting stability in a case of jetting the ink using an ink jet method and the aggregation rate in a case of using the pretreatment liquid described below, the viscosity of the ink composition of the present disclosure is preferably in a range of 1 mPa·s to 30 mPa·s, more preferably in a range of 1 mPa·s to 20 mPa·s, still more preferably in a range of 2 mPa·s to 15 mPa·s, and particularly preferably in a range of 2 mPa·s to 10 mPa·s.

The viscosity of the ink composition is obtained by measuring the ink composition under a temperature condition of 25° C. using VISCOMETER TV-22 (manufactured by TOKI SANGYO CO., LTD.).

It is preferable that the ink composition of the present disclosure contains a pigment coated with a polymer dispersing agent containing a carboxy group, and resin particles, in which the content of the solid content is in a range of 7% by mass to 10% by mass and the content ratio of the solid content other than the pigment to the pigment is in a range of 0.8 to 1.6 in terms of the mass ratio, and more preferable that the ink composition contains a pigment coated with an acrylic polymer, and self-dispersing resin particles, in which the content of the solid content is in a range of 7% by mass to 9% by mass and the content ratio of the solid content other than the pigment to the pigment is in a range of 1.0 to 1.4 in terms of the mass ratio.

Hereinbefore, the ink set according to the embodiment of the present disclosure has been described, but the specific configuration of the ink set according to the embodiment of the present invention is not particularly limited as long as the ink set contains the ink composition and the pretreatment liquid.

Examples of suitable configurations of the ink set according to the embodiment of the present disclosure include a configuration (three color configuration) formed of a combination of cyan ink serving as the ink composition, magenta ink serving as the ink composition, yellow ink serving as the ink composition, and the pretreatment liquid; and a configuration (four color configuration) formed of a combination of black ink serving as the ink composition, cyan ink serving as the ink composition, magenta ink serving as the ink composition, yellow ink serving as the ink composition, and the pretreatment liquid.

Here, the ink set according to the embodiment of the present disclosure may be an ink set with the one color configuration or the two color configuration formed of one or two kinds of ink compositions and the pretreatment liquid as necessary.

Further, the ink set according to the embodiment of the present disclosure may contain other ink compositions as necessary, for example, at least one selected from light cyan ink, light magenta ink, or light yellow ink in addition to the ink composition described above. As other ink compositions described above, known ink compositions can be used without particular limitation.

Further, the ink set according to the embodiment of the present disclosure may contain two or more kinds of pretreatment liquids as necessary.

The ink set according to the embodiment of the present disclosure is used suitable for the following image recording method according to the embodiment of the present disclosure.

<Image Recording Method>

The image recording method according to the embodiment of the present disclosure is carried out using the ink set according to the embodiment of the present disclosure and includes a pretreatment liquid application step of applying the pretreatment liquid to a recording medium; and an ink application step of applying the ink composition to the recording medium to which the pretreatment liquid has been applied in the pretreatment liquid application step.

By employing the image recording method with such a configuration, a decrease in uniformity of an image can be suppressed.

(Pretreatment Liquid Application Step)

The pretreatment liquid application step is a step of applying the pretreatment liquid to the recording medium.

The pretreatment liquid can be applied using a known method such as a coating method, an ink jet method, or an immersion method. Examples of the coating method include known coating methods carried out using an extrusion die coater, an air doctor coater, a blade coater, a rod coater, a knife coater a squeeze coater, a reverse roll coater, and a bar coater. The details of the ink jet method will be described below.

The pretreatment liquid application step is provided before the ink application step performed using the ink composition.

That is, the pretreatment liquid for aggregating components in the ink composition is applied in advance before the ink composition is applied (jetted) onto the recording medium, and the ink composition is jetted so as to come into contact with the pretreatment liquid applied onto the recording medium to obtain an image.

In this manner, ink jet recording can be carried out at a high speed and a high-resolution image with a high density can be obtained even in a case where the recording is carried out at a high speed.

Further, in the present disclosure, it is preferable that the pretreatment liquid on the recording medium is heated and dried after the pretreatment liquid is applied onto the recording medium until the ink composition is applied. In this manner, ink colorability such as a property of preventing bleeding is excellent and a visible image with a satisfactory color density and a satisfactory hue can be recorded.

The pretreatment liquid can be heated and dried using known heating means such as a heater, air blowing means for blowing air using a dryer or the like, and means for combining these.

Examples of the method of heating the pretreatment liquid include a method of applying heat using a heater or the like from a side of the recording medium opposite to the surface to which the pretreatment liquid has been applied; a method of applying warm air or hot air to the surface of the recording medium to which the pretreatment liquid has been applied; a method of heating the pretreatment liquid using an infrared heater; and a method of combining a plurality of these methods.

(Ink Application Step)

In the ink application step, the above-described ink composition is applied (jetted) onto the recording medium (onto the pretreatment liquid of the recording medium) to which the pretreatment liquid has been applied according to an ink jet method.

In the present step, the ink composition can be applied onto the recording medium, and a desired visible image can be recorded. Further, the details of the ink composition are as described above.

The ink jet method is not particularly limited, and any of known methods such as an electric charge control method of allowing an ink to be jetted using an electrostatic attraction force; a drop-on-demand method (pressure pulse method) using a vibration pressure of a piezoelectric element; an acoustic ink jet method of allowing an ink to be jetted using a radiation pressure by converting an electric signal into an acoustic beam and irradiating the ink with the acoustic beam; and a thermal ink jet (bubble jet (registered trademark)) method of heating an ink to form bubbles and utilizing the generated pressure may be used. As the ink jet method, particularly, an ink jet method described in JP1979-059936A (JP-S54-059936A) in which the ink is jetted from a nozzle using an action force caused by a rapid change in volume of the ink after being subjected to an action of thermal energy can be effectively used.

Further, examples of the ink jet method include a method of jetting a small volume of an ink having a low density, which is referred to as a photo ink, multiple times, a method of improving the image quality using a plurality of inks having substantially the same hue and different densities, and a method of using a colorless transparent ink.

Further, an ink jet head used in the ink jet method may be operated by an on-demand system or a continuous system. Specific examples of the jetting system include an electromechanical conversion system (such as a single cavity type, a double cavity type, a bender type, a piston type, a share mode type, or a shared wall type), an electrothermal conversion system (such as a thermal ink jet type or a bubble jet (registered trademark) type), an electrostatic attraction system (such as an electric field control type or a slit jet type), and an electrical jetting system (such as a spark jet type), and any jetting system may be used.

Further, the ink nozzle and the like used in a case of performing recording using the ink jet method is not particularly limited and can be selected as appropriate depending on the purpose thereof.

Examples of the system of the ink jet head include a shuttle system of performing recording while scanning a short serial head in the width direction of the recording medium; and a line system of using a line head in which recording elements are aligned in correspondence with the entire area of one side of the recording medium. In the line system, image recording can be performed on the entire surface of the recording medium by scanning the recording medium in a direction intersecting the direction in which the recording elements are aligned. In the line system, a transport system such as a carriage that scans a short head in the shuttle system is not necessary. Further, in the line system, since the movement of a carriage and complicated scanning control between the head and the recording medium are not necessary so that only the recording medium moves, the recording can be performed at a higher speed as compared with the shuttle system.

The image recording method according to the embodiment of the present disclosure can be applied to any of these systems. Typically, in a case where the image recording method is applied to the line system in which a dummy jet is not performed, the effect of improving the jet accuracy and the rub resistance of the image increases.

It is preferable that the ink application step is started in 10 seconds after the pretreatment liquid application step and more preferable that the image recording step is started in a time range of 0.1 seconds to 10 seconds. In this manner, an image can be recorded at a high speed.

Further, in the image recording method according to the embodiment of the present disclosure, the landing interference is suppressed so that a high-definition image can be recorded by using the ink set described above even in a case where the image is recorded at a high speed.

The expression "started in 10 seconds after the pretreatment liquid application step" means that the time taken from completion of application and drying of the pretreatment liquid to landing of the initial ink droplet on the recording medium is shorter than 10 seconds.

Further, in the ink application step, the liquid droplet amount of ink droplets to be applied (jetted) is preferably in a range of 1.5 pL to 3.0 pL and more preferably in a range of 1.5 pL to 2.5 pL, from the viewpoint of a printed image with a high resolution.

In addition, the liquid droplet amount of the ink droplets can be adjusted by appropriately selecting the jetting conditions in the ink jet method according to the ink composition to be jetted.

(Heating and Fixing Step)

In the present disclosure, it is preferable that a heating and fixing step of heating and fixing the image (ink) recorded by the ink application step is further provided after the ink application step.

The image on the recording medium is fixed by such a heating and fixing step, and thus the rub resistance of the image is further improved.

It is preferable that the image is heated at a temperature higher than or equal to the minimum filming temperature (MFT) of the resin particles in the image. By heating the image at MFT or higher, the particles are filmed and thus the image is enhanced.

In a case where the image is heated and further pressed at the same time, the pressure in the case of pressing the image is preferably in a range of 0.1 MPa to 3.0 MPa, more preferably in a range of 0.1 MPa to 1.0 MPa, and still more preferably in a range of 0.1 MPa to 0.5 MPa from the viewpoint of making the surface smooth.

The heating method is not particularly limited, and suitable examples thereof include drying methods in a non-contact manner such as a heating method using a heating element such as a nichrome wire heater, a method of supplying warm air or hot air, and a heating method using a halogen lamp and an infrared lamp.

Further, the heating and pressing method is not particularly limited, and suitable examples thereof include methods of performing heating and fixing in a contact manner such as a method of pressing a hot plate to a surface of a recording medium on which an image is recorded; and a method of passing a pair of rollers or the like using a heating and pressing device that comprises a pair of heating and pressing rollers, a pair of heating and pressing belts, or a heating and pressing belt disposed on a surface side of a recording medium on which an image is recorded and a holding roller disposed on the opposite side thereof.

In a case of the heating and the pressing, the nip time is preferably in a range of 1 millisecond to 10 seconds, more preferably in a range of 2 milliseconds to 1 second, and still more preferably in a range of 4 milliseconds to 100 milliseconds. Further, the nip width is preferably in a range of 0.1 mm to 100 mm, more preferably in a range of 0.5 mm to 50 mm, and still more preferably in a range of 1 mm to 10 mm.

As the heating and pressing roller, a metal roller made of a metal or a roller provided with a coating layer that has an elastic member in the vicinity of a core metal made of a metal and a surface layer (or also referred to as a release layer) as necessary may be used. The core metal can be formed of a cylindrical body made of iron, aluminum, stainless steel (SUS), and the like, and it is preferable that at least a part of the surface of the core metal is coated with the coating layer.

Particularly, it is preferable that the coating layer is formed of a silicone resin or a fluorine resin having release properties. Further, it is preferable that a heating element is included in the core metal of one heating and pressing roller, and the heat treatment and the pressure treatment may be performed at the same time by allowing the recording medium to pass between the rollers or the heat treatment may be performed by interposing the recording medium between two heating rollers as necessary. As the heating element, a halogen lamp heater, a ceramic heater, and a nichrome wire are preferable.

As a belt base material that forms a heating and pressing belt used for a heating and pressing device, seamless electroformed nickel is preferable and the thickness of the base material is preferably in a range of 10 μm to 100 μm. Further, aluminum, iron, and polyethylene other than nickel can be used as the material of the belt base material. In a case where a silicone resin or a fluorine resin is provided, the thickness of a layer to be formed using these resins is preferably in a range of 1 μm to 50 μm and more preferably in a range of 10 μm to 30 μm.

In order to realize the pressure (nip pressure), an elastic member such as a sprint having a tensile force may be selected and then disposed on both ends of a roller such as a heating and pressing roller such that a desired nip pressure can be obtained by considering the nip gap.

The transport speed of the recording medium in a case of using a heating and pressing roller or a heating and pressing belt is preferably in a range of 200 mm/sec to 700 mm/sec, more preferably in a range of 300 mm/sec to 650 mm/sec, and still more preferably in a range of 400 mm/sec to 600 mm/sec.

(Recording Medium)

In the image recording method according to the embodiment of the present disclosure, an image is recorded on the recording medium as described above.

The recording medium is not particularly limited, but general printing paper mainly formed of cellulose, which is used for general offset printing and the like, can be used.

Further, so-called coated paper is suitable as the recording medium.

The coated paper is formed by providing a coating layer containing an inorganic pigment and the like on a surface of high-quality paper, alkaline paper, or the like which is mainly formed of cellulose serving as a support and is not usually surface-treated. In the coated paper, image unevenness tends to occur in an image area, but the occurrence of the image unevenness in the image area can be effectively suppressed in a case where the pretreatment liquid contains phosphoric acid or a phosphoric acid compound. Specific examples thereof include art paper, coated paper, light-weight coated paper, and fine coated paper.

The inorganic pigment contained in the coating layer is not particularly limited, but at least one selected from silica, kaolin, clay, baked clay, zinc oxide, tin oxide, magnesium sulfate, aluminum oxide, aluminum hydroxide, psuedoboehmite, calcium carbonate, sachin white, aluminum silicate, smectite, zeolite, magnesium silicate, magnesium carbonate, magnesium oxide, or diatomaceous earth is preferable, and calcium carbonate, silica, and kaolin are more preferable.

As the recording medium, commercially available products can be used, and examples thereof include high-quality paper (A) such as "OK PRINCE HIGH QUALITY" (manufactured by Oji Paper Co., Ltd.), "SHIRAOI" (manufactured by Nippon Paper Industries Co., Ltd.), or "NEW NPI HIGH QUALITY" (manufactured by Nippon Paper Industries Co., Ltd.); fine coated paper such as "OK EVERLIGHT COAT" (manufactured by Oji Paper Co., Ltd.) or "AURORA S" (manufactured by Nippon Paper Industries Co., Ltd.); light-weight coated paper such as "OK COAT" (manufactured by Oji Paper Co., Ltd.) or "AURORA L" (manufactured by Nippon Paper Industries Co., Ltd.); coated paper (A2, B2) such as "OK TOP COAT+" (Oji Paper Co., Ltd.) or "AURORA COAT" (manufactured by Nippon Paper Industries Co., Ltd.); and art paper (A1) such as "OK KINTO+" (manufactured by Oji Paper Co., Ltd.), "UF COAT" (manufactured by Oji Paper Co., Ltd.), or "TOKUBISHI ART" (manufactured by Mitsubishi Paper Mills Ltd.). Further, various photographic papers for ink jet recording can also be used.

Among the examples, from the viewpoint of obtaining a high-quality image having a high effect of suppressing the movement of the coloring material and having a satisfactory color density and a satisfactory hue as compared to those of the related art, a recording medium having a water absorption coefficient Ka of 0.05 mL/m²·ms^{1/2} to 0.5 mL/m²·ms^{1/2} is preferable, a recording medium having a water absorption coefficient Ka of 0.1 mL/m²·m^{1/2} to 0.4 mL/m²·ms^{1/2} is more preferable, and a recording medium having a water absorption coefficient Ka of 0.2 mL/m²·ms^{1/2} to 0.3 mL/m²·ms^{1/2} is still more preferable.

The water absorption coefficient Ka is as described in JAPAN TAPPI Pulp and Paper Test Method No. 51: 2000 (Published by Japan Technical Association of the Pulp and Paper Industry). Specifically, the water absorption coefficient Ka is calculated from a difference in amount of water transfer between a contact time 100 ms and a contact time of 900 ms using an automatic scanning liquid absorptometer KM500Win (manufactured by Kumagai Riki Kogyo Co., Ltd.).

In the present disclosure, it is preferable that the amount of the pretreatment liquid to be applied and the amount of the aqueous ink to be applied are adjusted as necessary. For example, in order to adjust the physical properties such as the viscoelasticity of an aggregate formed by mixing the pretreatment liquid and the aqueous ink with each other, the amount of the pretreatment liquid to be applied may be changed depending on the recording medium.

EXAMPLES

Hereinafter, the present disclosure will be described in more detail with reference to examples. The scope of the present disclosure is not limited to the specific examples described below. Unless otherwise specified, "part(s)" and "%" are on a mass basis.

In the present example, the weight-average molecular weight, the pH, and the pKa were measured by the methods described above.

Examples 1 to 17 and Comparative Examples 1 to 4

<Synthesis of Polymer Dispersing Agent P-1>

A polymer dispersing agent P-1 was synthesized according to the following method based on the following scheme.

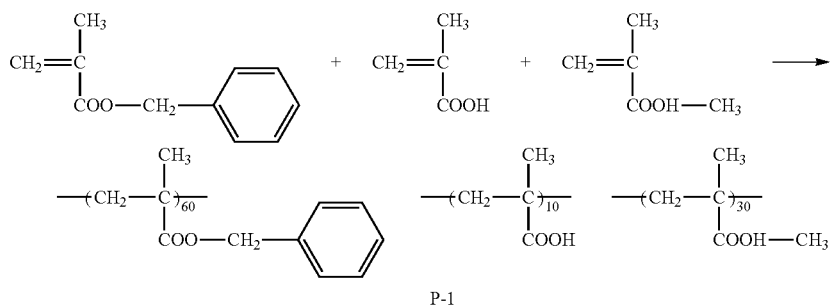

P-1

88 g of methyl ethyl ketone was added to a 1000 mL three-neck flask provided with a stirrer and a cooling pipe and heated at 72° C. in a nitrogen atmosphere, and a solution obtained by dissolving 0.85 g of dimethyl 2,2'-azobisisobutyrate, 60 g of benzyl methacrylate, 10 g of methacrylic acid, and 30 g of methyl methacrylate in 50 g of methyl ethyl ketone was added dropwise thereto for 3 hours. After completion of the dropwise addition, the solution was allowed to react for 1 hour, a solution obtained by dissolving 0.42 g of dimethyl 2,2'-azobisisobutyrate in 2 g of methyl ethyl ketone was added thereto, and the solution was heated to 78° C. and further heated for 4 hours.

The obtained reaction solution was reprecipitated twice in an excessive amount of hexane, and the deposited resin was dried, thereby obtaining 96 g of the polymer dispersing agent P-1. Further, the numerical value of each constitutional unit of the polymer dispersing agent P-1 described above indicates the mass ratio.

The composition of the obtained resin was confirmed by $^1$H-NMR, and the weight-average molecular weight (Mw) acquired by GPC was 44600. Further, the acid value acquired by the method described in JIS standard (JISK0070:1992) was 65.2 mgKOH/g.

<Preparation of Pigment Dispersion Liquid>
(Preparation of Cyan Dispersion Liquid)

5 parts of Pigment Blue 15:3 (phthalocyanine blue A220, manufactured by Dainichiseika Color & Chemicals Mfg. Co., Ltd.) which is a cyan pigment, 2 parts of the polymer dispersing agent P-1, 42 parts of methyl ethyl ketone, 5.5 parts of a 1 N NaOH aqueous solution, and 87.2 parts of ion exchange water were mixed and dispersed using zirconia beads having a diameter of 0.1 mm for 2 to 6 hours by utilizing a bead mill.

After methyl ethyl ketone was removed at 55° C. and some water was further removed from the obtained dispersion under reduced pressure, a centrifugation treatment was performed at 8000 rpm (revolutions per minute) for 30 minutes using a high-speed centrifugal cooling machine 7550 (manufactured by KUBOTA CORPORATION) and a 50 mL centrifuge pipe, and the supernatant other than the precipitate was recovered. Thereafter, the pigment concentration was acquired from the absorbance spectrum, and then a dispersion (a cyan dispersion liquid C) of resin-coated pigment particles (a pigment coated with a polymer dispersing agent) having a pigment concentration of 10.2% by mass was obtained. The average particle diameter of the obtained cyan dispersion liquid C was 105 nm.

(Preparation of Magenta Dispersion Liquid)

A dispersion (a magenta dispersion liquid M) of resin-coated pigment particles (a pigment coated with a polymer dispersing agent) was prepared in the same manner as in the preparation of the cyan dispersion liquid except that Pigment Red 122 serving as a magenta pigment was used in place of Pigment Blue 15:3 (phthalocyanine blue A220, manufactured by Dainichiseika Color & Chemicals Mfg. Co., Ltd.) in the preparation of the cyan dispersion liquid. The average particle diameter of the obtained magenta dispersion liquid M was 85 nm.

<Preparation of Self-Dispersing Resin Particles>

A 2 L three-neck flask provided with a stirrer, a thermometer, a reflux cooling pipe, and a nitrogen gas introduction pipe was charged with 360.0 g of methyl ethyl ketone and heated to 75° C. While the temperature inside the reaction container was maintained at 75° C., a mixed solution formed of 180.0 g of phenoxy ethyl acrylate, 162.0 g of methyl methacrylate, 18.0 g of acrylic acid, 72 g of methyl ethyl ketone, and 1.44 g of "V-601" (manufactured by FUJIFILM Wako Pure Chemical Corporation) was added dropwise thereto at a constant speed such that the dropwise addition was completed within 2 hours. After completion of the dropwise addition, a solution formed of 0.72 g of "V-601" and 36.0 g of methyl ethyl ketone was added thereto and the resulting solution was stirred at 75° C. for 2 hours, a solution formed of 0.72 g of "V-601" and 36.0 g of isopropanol was further added thereto and the resulting solution was stirred at 75° C. for 2 hours, and the solution was heated to 85° C. and further stirred 2 hours continuously. The weight-average molecular weight (Mw) of the obtained copolymer was 64000 (calculated by gel permeation chromatography (GPC) in terms of polystyrene, and TSKgel SuperHZM-H, TSKgel SuperHZ4000, and TSKgel SuperHZ200 (manufactured by Tosoh Corporation) were used as the columns), and the acid value thereof was 38.9 (mgKOH/g).

Next, 668.3 g of a polymer solution was weighed, 388.3 g of isopropanol and 145.7 mL of a 1 mol/L NaOH aqueous solution was added thereto, and the temperature in the reaction container was increased to 80° C. Next, 720.1 g of distilled water was added dropwise thereto at a speed of 20 ml/min for dispersion in water. Thereafter, the temperature in the reaction container was maintained at 80° C. for 2 hours, 85° C. for 2 hours, and 90° C. for 2 hours under the atmospheric pressure, the pressure in the reaction container was reduced, and a total of 913.7 g of isopropanol, methyl ethyl ketone, and distilled water were distilled off, thereby obtaining an aqueous dispersion (emulsion) of self-dispersing resin particles (B-01) having a concentration of solid contents of 28.0% by mass. Further, the numerical value of each constitutional unit of the compound example (B-01) shown below indicates the mass ratio. Hereinafter, the same applies to each structural formula.

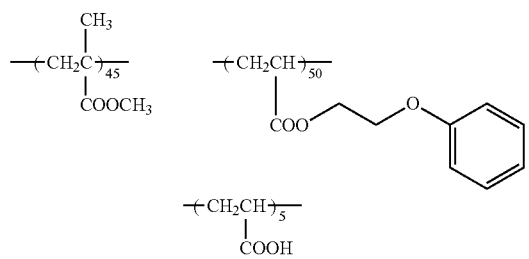

(B-01)

<Preparation of Ink>

Ink compositions (a magenta ink composition M and a cyan ink composition C) were respectively prepared by mixing respective components to have the ink composition listed in Table 1 using each of the pigment dispersion liquids (the cyan dispersion liquid C and the magenta dispersion liquid M) and the self-dispersing resin particles B-01 obtained in the above-described manner.

Each of the prepared ink compositions was filtered through a PVDF 5 μm filter (Millex SV, manufactured by Millipore Corporation, diameter of 25 mm) using a plastic disposable syringe to obtain inks (magenta ink M and cyan ink C).

TABLE 1

|  | Cyan ink C | Magenta ink M |
|---|---|---|
| Cyan pigment (pigment Blue 15:3) | 5% by mass | — |
| Magenta ink (Pigment Red 122) | — | 5% by mass |
| Polymer dispersing agent P-1 | 2% by mass | 2% by mass |
| Glycerin | 2% by mass | 2% by mass |
| Propylene glycol | 12% by mass | 12% by mass |
| Self-dispersing resin particles (B-01) | 8% by mass | 8% by mass |
| OLEFIN E1010 | 1% by mass | 1% by mass |
| Water | 70% by mass | 70% by mass |

<Explanation of Table 1>
OLFINE E1010 ... nonionic surfactant (manufactured by Nissin Chemical Industry Co., Ltd.)

<Preparation of Pretreatment Liquid>

The following compositions were mixed to prepare pretreatment liquids 1 to 21.

—Composition of Pretreatment Liquid—

Malonic acid . . . amount listed in Table 2.
Citric acid . . . amount listed in Table 2.
Phosphoric acid (orthophosphoric acid) . . . amount listed in Table 2
Water-soluble polymer listed in Table 2 . . . amount listed in Table 2
Diethylene glycol monobutyl ether . . . 1% by mass
Potassium hydroxide . . . amount listed in Table 2
BYK-038 (antifoaming agent) . . . 0.01% by mass
Ion exchange water . . . remaining amount <Ink Set>

Ink sets 1 to 21 were prepared by combining each ink (magenta ink M and cyan ink C) with each pretreatment liquid (pretreatment liquids 1 to 21) described above.

<Ink Jet Image Recording>

A UF coat (manufactured by Oji Paper Co., Ltd.) was prepared as a recording medium having a coating layer containing calcium carbonate, and images were recorded under the following image recording conditions using the ink sets 1 to 21 described above.

In the following image recording, ink jetting was started in 10 seconds after the pretreatment liquid application step.

(Pretreatment Liquid Application Step)

The surface of the recording medium was coated with the pretreatment liquid using a coating bar such that the coating amount thereof reached 1.7 g/m$^2$, immediately before the application of the ink to the recording medium.

Next, the pretreatment liquid applied onto the recording medium was dried under the following conditions.

~Drying Conditions for Pretreatment Liquid (Blast Drying)~

Wind speed: 15 m/s

Temperature and heating method: The pretreatment liquid was heated using a contact-type planar heater from the rear surface (the surface on a side where the pretreatment liquid was not applied) of the recording medium such that the surface temperature (the temperature of the surface on a side where the pretreatment liquid was applied) of the recording medium was set to 60° C.

Air blowing region: 450 mm (drying time of 0.7 seconds)

(Ink Application Step)

Two-color single-pass image recording was performed on the recording medium to which the pretreatment liquid was applied under the following conditions.

Specifically, an image was recorded by applying (jetting) inks of each color on the pretreatment liquid of the recording medium to which the pretreatment liquid was applied under the following conditions.

Head: A head in which 1,200 dpi/20 inch width piezo full line heads were disposed for four colors was used.

Amount of liquid droplets to be jetted: set to 2.4 pL

Drive frequency: set to 30 kHz (transport speed of recording medium: 635 mm/sec).

Next, the ink applied onto the recording medium was dried under the following conditions.

~Drying Conditions for Ink (Blast Drying)~

Wind speed: 15 m/s

Temperature: The ink was heated from the rear surface (the surface on a side where the ink was not applied) of the recording medium using a contact-type planar heater such that the surface temperature (the temperature of the surface on a side where the ink was applied) of the recording medium was set to 60°.

Air blowing region: 640 mm (drying time of 1 second)

(Heating and Fixing Step)

The image recorded by applying the above-described ink was heated and fixed under the following conditions using a silicon rubber roller (hardness of 50°, nip width of 5 mm).

In this manner, a sample in which an image was recorded on the recording medium was obtained.

~Conditions of Heating and Fixing~

Roller temperature: 90° C.
Pressure: 0.8 MPa

<Evaluation>

(Image Unevenness)

In the ink application step, a solid blue image (halftone dot rate of 30%) was recorded using the cyan ink C and the magenta ink M.

The obtained solid image was subjected to the above-described heating and fixing treatment.

The solid image after the heating and fixing treatment was visually observed, and the uniformity of the image was evaluated based on the following evaluation standards and used as an index of the image unevenness. The evaluation results are listed in Table 2.

—Evaluation Standards—

6: Color spots were not found throughout the entire image and the color was uniform.

5: Color spots were rarely observed in a case where the image was viewed closely, but the color was almost uniform as a whole.

4: Color spots were observed, but a difference in shade was extremely small.

3: A small number of color spots were observed, and a difference in shade was partially observed.

2: Color spots were scattered and a difference in shade was partially observed, but it was within the practically acceptable range.

1: Large striped shades were generated, which was out of the practically acceptable range.

(Evaluation of White Spots)

In the ink application step, a solid blue image (halftone dot rate of 100%) was recorded using the cyan ink C and the magenta ink M.

The obtained solid image was subjected to the above-described heating and fixing treatment.

After the heating and fixing treatment, the finger moistened with water was lightly wiped with a cloth, the finger was brought into contact with the surface of the image, allowed to stand for 1 second, and then released. The region in the image where the finger was in contact was visually observed, and the degree of white spots was evaluated based on the following evaluation standards. The evaluation results are listed in Table 2.

Further, the white spots indicate white portions on a recorded image, which were generated by deposition of calcium.

—Evaluation Standards—

A: White spots were not generated.
B: White spots were generated and removed by wiping.
C: White spots were generated, but were not removed by wiping.

(Member Corrosiveness)

A stainless steel plate (SUS303) having a size of 15 mm×10 mm×5 mm was prepared in the pretreatment liquid, and the stainless steel plate was immersed therein while being heated at 60° C. for 3 days, and the degree of corrosion was visually evaluated. The evaluation was performed based on the following evaluation standards.

—Evaluation Standards—

3: Corrosion was not observed at all.

2: Corrosion was slightly observed, but it was within the practically acceptable range.

1: Corrosion was significant, which was out of the practically acceptable range.

(Liquid Stability)

After preparation of the pretreatment liquid, the pretreatment liquid was allowed to stand at 25° C. for 1 hour, occurrence of deposits and/or phase separation was visually observed, and the liquid stability of the pretreatment liquid was evaluated based on the following evaluation standards.

—Evaluation Standards—

A: After preparation of the pretreatment liquid, deposits and/or phase separation did not occur.

B: After preparation of the pretreatment liquid, deposits and/or phase separation occurred (Evaluation of Bleeding of Image)

In the ink application step, a character image was recorded using the cyan ink C.

The obtained character image was subjected to the above-described heating and fixing treatment, and the character image (unicode: U+9DF9; 2 pt, 3 pt, 4 pt, and 5 pt) shown in FIG. 1 was recorded.

The recorded character image was observed, and the bleeding of the image was evaluated based on the following evaluation standards.

The results are listed in Table 2.

In the evaluation standards described below, the rank at which image bleeding is most suppressed is "5".

—Evaluation Standards for Bleeding of Image—

5: A 2 pt character was able to be reproduced.

4: A 3 pt character was able to be reproduced, but a 2 pt character was not able to be reproduced.

3: A 4 pt character was able to be reproduced, but a character with a size of 3 pt or less was not able to be reproduced.

2: A 5 pt character was able to be reproduced, but a character with a size of 4 pt or less was not able to be reproduced.

1: A 5 pt character was not able to be reproduced.

Figure 2:
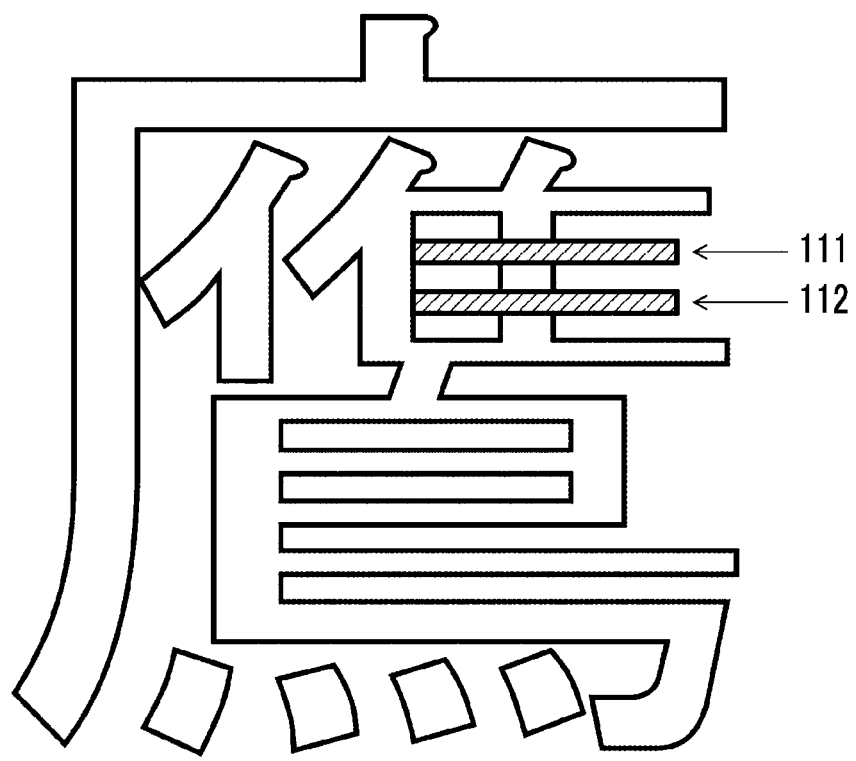
FIG. 2 is a view for explaining the details of evaluation standards for bleeding of images in the examples.

The expression of "was able to be reproduced" means that the horizontal line indicated by the reference numeral 111 in FIG. 2 and the horizontal lines indicated by the reference numeral 112 in FIG. 2 in the character image of FIG. 2 are separated from each other as viewed from a distance of 0.5 m.

TABLE 2

|  | Example 1 | Example 2 | Example 3 | Example 4 | Example 5 | Example 6 | Example 7 | Example 8 | Example 9 | Example 10 |
|---|---|---|---|---|---|---|---|---|---|---|
| Pretreatment liquid | 1 | 2 | 3 | 4 | 5 | 6 | 7 | 8 | 9 | 10 |
| Malonic. acid [% by mass] | 10.9 | 10.9 | 5.4 | 10.9 | 10.9 | 10.9 | 10.9 | 10.9 | 10.9 | 10.9 |
| Citric acid [% by mass] | 13.4 | 114 | 13.4 | 13.4 | 13.4 | 13.4 | 13.4 | 13.4 | 13.4 | 13.4 |
| Phosphoric acid [% by mass] | — | — | 3.4 | — | — | — | — | — | — | — |
| Potassium hydroxide [% by mass] | 7.3 | 7.3 | 7.3 | 7.3 | 7.3 | 7.3 | 7.3 | 7.3 | 7.3 | 7.3 |
| Water-soluble polymer | PEG 3 | Polyacrylic acid | PVP 1 | PVP 1 | PVP 1 | PVP 1 | PVP 1 | PVP 1 | PVP 1 | PVP 1 |
| Content [% by mass] | 1 | 1 | 1 | 0.05 | 0.1 | 0.5 | 1 | 3 | 6 | 9 |
| pH | 4.3 | 4.3 | 4.3 | 4.3 | 4.3 | 4.3 | 4.2 | 4.3 | 4.3 | 4.3 |
| Maximum pKa of acid group | 5.69 | 5.69 | 11.46 | 5.69 | 5.69 | 5.69 | 5.69 | 5.69 | 5.69 | 5.69 |
| Total content of acid group with respect to 100 g of pretreatment liquid [mol] | 0.47 | 0.42 | 0.42 | 0.42 | 0.42 | 0.42 | 0.42 | 0.42 | 0.42 | 0.42 |
| Image unevenness | 4 | 3 | 6 | 4 | 5 | 6 | 6 | 6 | 6 | 6 |
| Member corrosiveness | 3 | 3 | 2 | 3 | 3 | 3 | 3 | 3 | 3 | 3 |
| White spots | C | C | A | C | C | C | C | C | C | C |
| Liquid stability | A | A | A | A | A | A | A | A | A | A |
| Bleeding | 5 | 5 | 5 | 5 | 5 | 5 | 5 | 5 | 5 | 5 |

|  | Example 11 | Example 12 | Example 13 | Example 14 | Example 15 | Example 16 | Example 17 | Comparative Example 1 | Comparative Example 2 | Comparative Example 3 | Comparative Example 4 |
|---|---|---|---|---|---|---|---|---|---|---|---|
| Pretreatment liquid | 11 | 12 | 13 | 14 | 15 | 16 | 17 | 18 | 19 | 20 | 21 |
| Malonic. acid [% by mass] | 10.9 | 10.9 | 8.7 | 6.5 | 5A | 4.4 | 10.9 | 10.9 | 10.9 | 10.9 | 10.9 |
| Citric acid [% by mass] | 13.4 | 13.4 | 10.7 | 8 | 6.7 | 5.4 | 13.4 | 13.4 | 13.4 | 13.4 | 13.4 |
| Phosphoric acid [% by mass] | — | — | — | — | — | — | — | — | — | — | — |

TABLE 2-continued

| | | | | | | | | | | | |
|---|---|---|---|---|---|---|---|---|---|---|---|
| Potassium hydroxide [% by mass] | 7.3 | 7.3 | 5.8 | 4.4 | 3.7 | 2.9 | 3.7 | 7.3 | 7.3 | 7.3 | — |
| Water-soluble polymer | PVP 2 | PVP3 | PVP 1 | PVP 1 | PVP 1 | PVP1 | PVP 1 | — | PEG 1 | PEG 2 | PVP 1 |
| Content [% by mass] | 1 | 1 | 1 | 1 | 1 | 1 | 1 | — | 1 | 1 | 1 |
| pH | 4.3 | 4.3 | 4.2 | 4.2 | 4.2 | 4.2 | 2.4 | 4.2 | 4.3 | 4.3 | 0.9 |
| Maximum pKa of acid group | 6.69 | 5.69 | 5.69 | 5.69 | 5.69 | 5.69 | 5.69 | 5.69 | 5.69 | 5.69 | 5.69 |
| Total content of acid group with respect to 100 g of pretreatment liquid [mol] | 0.42 | 0.42 | 0.34 | 0.'75 | 0.21 | 0.17 | 0.42 | 0.42 | 0.42 | 0.42 | 0.42 |
| Image unevenness | 6 | 6 | 6 | 6 | 6 | 6 | 6 | 1 | 1 | 2 | 6 |
| Member corrosiveness | 3 | 3 | 3 | 3 | 3 | 3 | 2 | 3 | 3 | 3 | 1 |
| White spots | C | C | C | C | B | B | C | C | C | C | C |
| Liquid stability | A | A | A | A | A | A | A | A | A | A | A |
| Bleeding | 5 | 5 | 4 | 4 | 3 | 2 | 5 | 5 | 5 | 5 | 5 |

The details of the respective components listed in Table 2 are as follows.

PEG1: Polyethylene glycol (polyethylene glycol 2000, manufactured by FUJIFILM Wako Pure Chemical Corporation, weight-average molecular weight of 2000)

PEG2: Polyethylene glycol (polyethylene glycol 4000, manufactured by FUJIFILM Wako Pure Chemical Corporation, weight-average molecular weight of 4000)

PEG3: Polyethylene glycol (polyethylene glycol 6000, manufactured by FUJIFILM Wako Pure Chemical Corporation, weight-average molecular weight of 6000)

PVP1: Polyvinylpyrrolidone (Polyvinylpyrrolidone K-15, manufactured by Wako Pure Chemical Corporation, weight-average molecular weight of 10000)

PVP2: Polyvinylpyrrolidone (polyvinylpyrrolidone K-30, manufactured by FUJIFILM Wako Pure Chemical Corporation, weight-average molecular weight of 24500)

PVP3: Polyvinylpyrrolidone (polyvinylpyrrolidone K-90, manufactured by FUJIFILM Wako Pure Chemical Corporation, weight-average molecular weight of 40000)

Polyacrylic acid: Polyacrylic acid (25000, manufactured by FUJIFILM Wako Pure Chemical Corporation, weight-average molecular weight of 25000)

As listed in Table 2, the image unevenness and the member corrosiveness were excellent in Examples 1 to 17.

Among these, in Example 1 in which polyethylene glycol serving as a nonionic water-soluble polymer was used, the image unevenness was excellent as compared to Example 2 in which polyacrylic acid serving as an ionic water-soluble polymer was used.

In Examples 1 to 14 in which the total content of the acid groups in the acids and the salts of the acids was 0.25 mol or greater with respect to 100 g of the pretreatment liquid, the bleeding of the image was further suppressed as compared with Examples 15 and 16.

EXPLANATION OF REFERENCES

111: 11th stroke
112: 12th stroke

What is claimed is:

1. A pretreatment liquid comprising:
    a water-soluble polymer having a weight-average molecular weight of 5000 or greater;
    acids; and
    salts of the acids,
    wherein at least one of the acids is a carboxylic acid, and at least one salt of the acids is a salt of the carboxylic acid, and
    a total content of acid groups in the acids and the salts of the acids is 0.25 mol or greater with respect to 100 g of the pretreatment liquid.

2. The pretreatment liquid according to claim 1,
    wherein a pH of the pretreatment liquid is smaller than a maximum pKa of an acid group contained in the acids and the salts of the acids.

3. The pretreatment liquid according to claim 1,
    wherein the water-soluble polymer contains at least one selected from the group consisting of polyvinylpyrrolidone, polyethylene glycol, and polyacrylic acid.

4. The pretreatment liquid according to claim 1,
    wherein the water-soluble polymer is a nonionic water-soluble polymer.

5. The pretreatment liquid according to claim 1,
    wherein a content of the water-soluble polymer is in a range of 0.1% by mass to 9% by mass with respect to a total mass of the pretreatment liquid.

6. The pretreatment liquid according to claim 1, further comprising:
    at least one of phosphoric acid or a salt of the phosphoric acid.

7. The pretreatment liquid according to claim 1,
    wherein the salt of the carboxylic acid is a salt of an alkali metal.

8. An ink set comprising:
    the pretreatment liquid according to claim 1; and
    an ink composition containing water and a colorant.

9. An image recording method comprising:
    a pretreatment liquid application step of applying the pretreatment liquid in the ink set according to claim 8 to a recording medium; and
    an ink application step of applying the ink composition in the ink set according to claim 8 to the recording medium to which the pretreatment liquid has been applied in the pretreatment liquid application step.

10. The image recording method according to claim 9, further comprising:
- a heating and fixing step of heating and fixing an image recorded by the ink application step.

11. The pretreatment liquid according to claim 1, wherein the carboxylic acid has two or more carboxy groups.

12. The pretreatment liquid according to claim 1, wherein a pH of the pretreatment liquid is in a range of 4.0 to 5.0, and a maximum pKa of an acid group contained in the acids and the salts of the acids is greater than 5.69.

* * * * *